US010073602B2

(12) United States Patent
Perry et al.

(10) Patent No.: US 10,073,602 B2
(45) Date of Patent: Sep. 11, 2018

(54) SYSTEM AND METHOD FOR DISPLAYING A SUGGESTED LUMINANCE ADJUSTMENT FOR AN IMAGE

(71) Applicant: CANON KABUSHIKI KAISHA, Tokyo (JP)

(72) Inventors: Stuart William Perry, St. Ives (AU); Myriam Elisa Lucie Amielh, Killarney Heights (AU)

(73) Assignee: CANON KABUSHIKI KAISHA, Tokyo (JP)

(*) Notice: Subject to any disclaimer, the term of this patent is extended or adjusted under 35 U.S.C. 154(b) by 27 days.

(21) Appl. No.: 15/081,614

(22) Filed: Mar. 25, 2016

(65) Prior Publication Data

US 2016/0292836 A1 Oct. 6, 2016

(30) Foreign Application Priority Data

Mar. 30, 2015 (AU) ................................ 2015201623

(51) Int. Cl.
*G06T 5/00* (2006.01)
*G06F 3/0484* (2013.01)

(52) U.S. Cl.
CPC ...... *G06F 3/04845* (2013.01); *G06F 3/04847* (2013.01); *G06T 5/007* (2013.01); *G06T 2200/24* (2013.01); *G06T 2207/20081* (2013.01); *G06T 2207/20092* (2013.01); *G06T 2207/30168* (2013.01)

(58) Field of Classification Search
CPC .................................. G09G 3/00; G06K 9/00
See application file for complete search history.

(56) References Cited

U.S. PATENT DOCUMENTS

| | | | | |
|---|---|---|---|---|
| 7,593,603 | B1 | 9/2009 | Wilensky | |
| 7,982,747 | B1 | 7/2011 | Dulaney et al. | |
| 8,478,111 | B2 | 7/2013 | Stankiewicz et al. | |
| 2007/0036456 | A1* | 2/2007 | Hooper | G06T 5/008 382/274 |
| 2014/0010448 | A1* | 1/2014 | Lischinski | G06T 5/005 382/167 |

* cited by examiner

*Primary Examiner* — Samantha (Yuehan) Wang
(74) *Attorney, Agent, or Firm* — Canon U.S.A., Inc. IP Division

(57) ABSTRACT

A system and method display a suggested luminance adjustment for an image. The method includes applying a contrast adjustment to a first region of the image. The contrast adjustment defines a preference for the contrast adjusted image and determines a second region of the contrast adjusted image based on a salience map associated with the contrast adjusted image and the preference for the contrast adjusted image. The method further includes displaying a visual indication of the suggested luminance adjustment for the second region in association with the contrast adjusted image. The suggested luminance adjustment is determined based on a preference of the contrast adjusted image with the suggested luminance adjustment applied.

20 Claims, 17 Drawing Sheets

SYSTEM AND METHOD FOR DISPLAYING A SUGGESTED LUMINANCE ADJUSTMENT FOR AN IMAGE

REFERENCE TO RELATED APPLICATION(S)

This application claims the benefit under 35 U.S.C. § 119 of the filing date of Australian Patent Application No. 2015201623, filed on 30 Mar. 2015, which is incorporated by reference in its entirety as if fully set forth herein.

TECHNICAL FIELD

The present invention relates generally to the field of image processing, and, in particular, to the field of processing of images according to their subjective quality as judged by humans in relation to displaying a suggested aspect adjustment for an image. The present invention relates to a system and method for displaying a suggested luminance adjustment for an image.

BACKGROUND

When processing images users often need to modify two aspects of the image at the same time. For example, adjusting the contrast and luminance simultaneously or removing noise from an image without affecting the contrast of the image. However, the overall quality of an image when two or more aspects are adjusted is difficult for a user to predict. For example, an adjustment in contrast that might be acceptable on its own becomes either too strong or not strong enough when a luminance adjustment is also made to the image. This problem is made even more complicated when adjusts are performed locally. Users of image editing software often need to resort to trial and error and iterative approaches to obtain a suitable result.

A related problem in the field of image processing is how to predict whether an observer will prefer one image over another and process imagery or guide the processing of imagery to provide the observer with the best possible image. A model of image preference could help the user to adjust multiple aspects of the image by predicting the optimal adjustments of the second aspect (such as luminance) in response to the user's adjustment of a first aspect (such as contrast).

There are many methods known for predicting observer preference between two images where one has undergone a transformation. Preference scores based on signal processing techniques such as Mean Square Error (MSE) and Peak Signal To Noise Ratio (PSNR) have some ability to predict observer preference, but fail in many cases to make reliable predictions. There are known methods that analyse the structural content of images and estimate observer preference based on the notion that observers prefer structural details to be preserved or enhanced in the transformed image. Other methods attempt to use machine learning to predict observer preference based on features extracted from either the original image, the transformed image or both images. Yet other methods attempt to partition the problem of estimating observer preference for an entire image into a sub-set of problems, each attempting to estimate observer preference for a sub-aspect of the image. For example, sub-aspects of an image might include the relative quality of colour reproduction between the original and the transformed image, the quality of brightness reproduction, the quality of detail preservation and the presence or absence of artefacts in the transformed image. By merging the observer preference scores for each of the sub-aspects, a prediction of the overall observer preference score for the transformed image is obtained.

However, known methods to quantify observer preference fail to perform well in many circumstances. Most of the known measures of image quality such as SSIM, PSNR and MSE are "Full Reference" and use the original image as a reference image. These measures consider any deviation of the transformed image from the original image to be a fault to be corrected. Hence these measures cannot be used to process an original image to obtain a transformed image that will be preferred more than the original image by an observer. As this is often the user's goal when adjusting multiple aspects of an image after capture. There are other measures of image quality that do not require a reference (so-called "No Reference" image quality measures). However, these measures generally rely on the detection of specific forms of artefacts such as JPEG blocking artefacts, and so aren't useful to generally process images to improve the rendering. A method has been developed that compares two images and indicates which of the two images is likely to be preferred by an observer and whether an observer will be indifferent to the differences between the two images.

A disadvantage of this method is that the method involves a number of polynomial functions that are not easily inverted to automatically obtain an optimal transformed image or suggest modifications to a second aspect of an image (such as luminance) in response to the user's modification to a first aspect of an image (such as contrast). Optimization methods can be used to compute or determine the optimal transformed image, however there are a number of problems with prior art optimisation methods. Because optimisation methods such as gradient descent or simulated annealing do not take into account the unique form of the function to optimised they would treat each pixel in the original image as a variable to be optimised. For imagery from modern cameras and scanners this results in optimisation problems involving millions or billions of variables. Solving such problems is slow and computationally expensive using existing technology.

SUMMARY

It is an object of the present disclosure to substantially overcome, or at least ameliorate, at least one disadvantage of present arrangements.

A first aspect of the present disclosure provides a method of displaying a suggested luminance adjustment for an image, the method comprising: applying a contrast adjustment to a first region of the image, the contrast adjustment defining a preference for the contrast adjusted image; determining a second region of the contrast adjusted image based on a salience map associated with the contrast adjusted image and the preference for the contrast adjusted image; and displaying a visual indication of the suggested luminance adjustment for the second region in association with the contrast adjusted image, wherein the suggested luminance adjustment is determined based on a preference of the contrast adjusted image with the suggested luminance adjustment applied.

In some aspects, the suggested local luminance adjustment is determined relative to at least one of the contrast adjustment applied to the first region and a saliency value associated with the second region.

In some aspects, the suggested luminance is determined based on the preference of the contrast adjusted image with the suggested luminance adjustment applied being greater than the preference for the contrast adjusted image.

In some aspects, displaying the visual indication comprises modifying display of a luminance control to indicate an optimal suggested luminance adjustment, the optimal suggested luminance adjustment being one of a plurality of luminance adjustments having a highest preference of the contrast adjusted image with a corresponding luminance adjustment applied.

In some aspects, displaying the visual indication comprises modifying display of a luminance control to indicate to a user a range of luminance adjustments determined to have positive preferences of the contrast adjusted image with the luminance adjustments of the range applied.

In some aspects, displaying the visual indication comprises modifying display of a luminance control to identify to a user a range of luminance adjustments determined to have negative preferences of the contrast adjusted image with the luminance adjustments of the range applied.

In some aspects, displaying the visual indication comprises displaying the suggested luminance adjustment as an overlay on the contrast adjusted image.

Some aspects of the present disclosure further comprise receiving a luminance adjustment after display of the visual indication and applying the received luminance adjustment to the contrast adjusted image.

Some aspects of the present disclosure further comprise applying a plurality of luminance adjustments to the contrast adjusted image, and determining a preference for each of the plurality of luminance adjustments applied to the contrast-adjusted image.

In some aspects, the suggested luminance adjustment is determined based upon the preferences of the plurality of luminance adjustment.

In some aspects, the second region is defined by a pixel map and a degree of change of luminance associated with each pixel in the pixel map.

In some aspects, the suggested luminance adjustment represents a degree of change of a luminance setting relating to each pixel of the second region.

In some aspects, the second region is determined based upon the salience map and a degree of difference user would perceive between the image and the contrast adjusted image.

Some aspects further comprise determining the salience map based upon the contrast adjusted image.

Another aspect of the present disclosure provides a non-transitory computer readable storage medium having a program recorded thereon, the program being executable by a processor for displaying a suggested aspect adjustment for an image, the program comprising: code for applying a first adjustment of a first aspect to a first region of the image, the first adjustment defining a preference for the adjusted image; code for selecting a second region of the adjusted image based on a salience map associated with the adjusted image and the preference for the adjusted image; and code for displaying a visual indication of a suggested second adjustment in association with the adjusted image, the second adjustment being of a second aspect for the second region, wherein the suggested second adjustment is determined based on a preference of the adjusted image with the second suggested adjustment applied.

Another aspect of the present disclosure provides an apparatus for displaying a suggested luminance adjustment for an image, the apparatus comprising: a memory; and a processor coupled to the memory for executing a computer program, the computer program comprising instructions for: applying a contrast adjustment to a first region of the image, the contrast adjustment defining a preference for the contrast adjusted image; determining a second region of the contrast adjusted image based on a salience map associated with the contrast adjusted image and the preference for the contrast adjusted image; and displaying a visual indication of the suggested luminance adjustment for the second region in association with the contrast adjusted image, wherein the suggested luminance adjustment is determined based on a preference of the contrast adjusted image with the suggested luminance adjustment applied; wherein the suggested local luminance adjustment is determined relative to at least one of the contrast adjustment applied to the first region and a saliency value associated with the second region.

Another aspect of the present disclosure provides a system for displaying a suggested aspect adjustment for an image; the system comprising: a computing device adapted to: apply a first adjustment of a first aspect to a first region of the image, the first adjustment defining a preference for the adjusted image; select a second region of the adjusted image based on a salience map associated with the adjusted image and the preference for the adjusted image; and display a visual indication of a suggested second adjustment in association with the adjusted image, the second adjustment being of a second aspect for the second region, wherein the suggested second adjustment is determined based on a preference of the adjusted image with the second suggested adjustment applied; wherein the suggested second adjustment is determined relative to at least one of the first adjustment applied to the first region and a saliency value associated with the second region.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Context

A "Multi-Factor Adjustment Method" (MFAM) system described herein is a method for guiding a user to create an optimally preferred image from a target image taking into account a prediction of observer preference scores. Once the user has adjusted a first aspect of the target image (such as contrast in the example given in this description), the MFAM system makes use of the "Multiple Degrees of Freedom" (MDOF) image quality metric (also referred to as the "observer preference score distribution") to find an optimal adjustment of a second aspect of the target image (such as luminance in the example given in this description) for each pixel of the target image to create a transformed image based on the target image that optimises preference for the transformed image. The optimal adjustment for each pixel of the image is then shown to the user and the range of adjustments of the second aspect that produce a transformed image preferred over the target image is also indicated to the user. The user can then select the optimal adjustment of the second aspect as suggested by the MFAM method, or modify the second aspect to the user's individual tastes.

In the MDOF metric, instead of modelling observer preference as a preference score in the form of a single value, the observer preference is modelled using a set of preference values that together are used to represent an observer preference score distribution with respect to each of the images being considered by an observer. In one example, three preference values are used in regard to an original (i.e. target) image A and a transformed image B (which is an image obtained by applying a transform process to the target image A). The three preference values are (i) "prefer image A", (ii) "prefer image B", and (iii) "are indifferent" (i.e. don't care). Additional preference values can also be used. For example, values used can be (iv) "don't like image A", (v) "don't like image B" and so on.

Figure 10A:
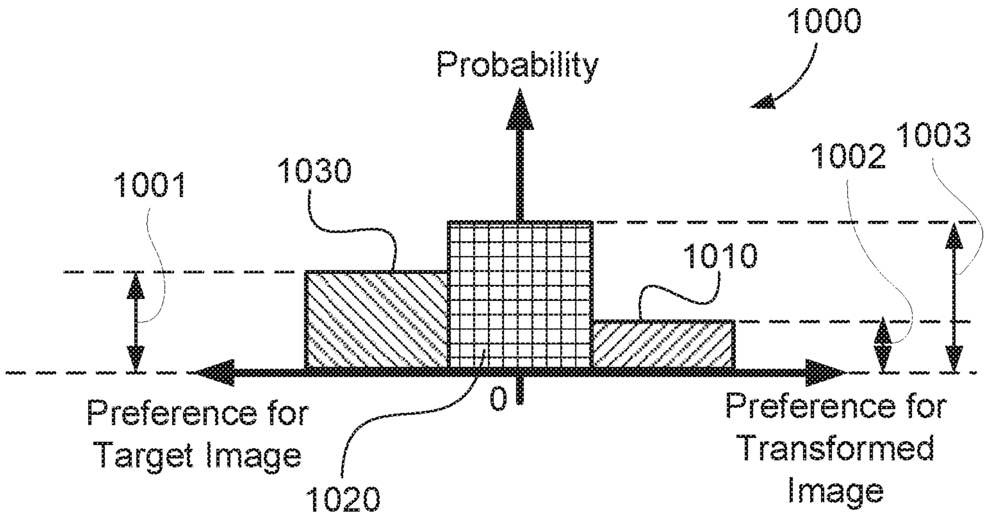
FIGS. 10A and 10B are representations of distributions of observer preference scores according to one MFAM arrangement.

FIG. 10A shows a representation of a distribution of observer preference scores according to one MDOF arrangement. In a first MDOF arrangement, three preference measures are used to represent observer preferences. In this case the preference measures can take a form depicted by 1000 in FIG. 10A. The diagram 1000 shows three preference measures 1010, 1020 and 1030.

The preference measure 1010 represents a probability of observers assigning preference scores indicating their preference for the transformed image. There are many ways to obtain a value 1002 of the preference measure 1010. The preference value 1002 (also referred to as the preference score 1002) for the preference measure 1010 can be obtained by counting the frequency of occurrence of numeric observer preference scores falling above a certain threshold, referred to as a preference threshold (for example an experiment may be conducted where observers are asked to rank their preference for two images between −100 and +100, where −100 means a complete preference for the target image and +100 means a complete preference of the transformed image. In the example of FIG. 10A, 30 might be a suitable preference threshold to assign preferences to preference measure 1010 and scores above 30 would be assigned to the preference measure 1010 and normalising the frequency to represent a probability or a percentage.

Alternatively, the preference value 1002 can be obtained by performing an experiment in which (A) observers are asked directly whether they prefer the transformed image, have no preference, or prefer the target image, and (B) the number of times observers state that they prefer the transformed image is counted. In another method, the preference value 1002 can be obtained by merely asking the observers whether they prefer the transformed image and counting the number of observers that consistently indicate that they prefer the transformed image more than a certain percentage of the time, referred to as a preference proportion (for example, 80%).

The preference measure 1020 represents the probability of observers assigning preference scores corresponding to "no preference" for either the target image or the transformed image. There are many ways to obtain a value 1003 of the preference measure 1020. The value 1003 can for example be obtained by counting the frequency of occurrence of numeric observer preference scores falling between two thresholds, referred to as preference thresholds, (for example, an experiment may be conducted where observers are asked to rank their preference for two images between −100 and +100, where −100 means a complete preference for the target image and +100 means a complete preference of the transformed image. In this example preference scores between −30 and +30 might be a considered indicative of the observer having no preference between the target image and the transformed image. In this case, the preference thresholds for preference measure 1020 might be selected to be −30 and +30 and normalising the frequency to represent a probability or a percentage. Alternatively the value 1003 can be obtained by an experiment where observers are asked directly whether they prefer the transformed image, have no preference, or prefer the target image, and then the number of times that the observers state that they had no preference is counted. In another method, the value 1003 can be obtained by merely asking the observers whether they prefer the transformed image and counting the number of observers that consistently indicate they prefer the transformed image within a certain percentage of the time, referred to as a preference proportion (for example, 20% to 80%).

The preference measure 1030 represents the probability of observers assigning preference scores corresponding to their preference for the target image. There are many ways to obtain a value 1001 of the preference measure 1030. The value 1001 can be obtained by counting the frequency of occurrence of numeric observer preference scores falling below a certain threshold, referred to as a preference threshold (for example, an experiment may be conducted where observers are asked to rank their preference for two images between −100 and +100, where −100 means a complete preference for the target image and +100 means a complete preference of the transformed image. In this example −30 might be a suitable preference threshold to assign preferences to preference measure 1030 and scores below −30 would be assigned to the preference measure 1030 and normalising the frequency to represent a probability or a percentage. Alternatively the value 1001 can be obtained by an experiment in which observers are asked directly whether they prefer the transformed image, have no preference, or prefer the target image and counting the number of times observers state that they prefer the target image. In another method, the value 1001 can be obtained by merely asking the observers whether they prefer the transformed image and counting the number of observers that consistently indicate they prefer the transformed image less than a certain percentage of the time, referred to as a preference proportion (for example, 20%). In the diagram 1000 the largest value of the three preference measure values 1001, 1002, 1003 is the value 1003 of the preference measure 1020 corresponding to the "no preference" case, reflecting that this was the most common observer preference score. The examples shown above use three preference measures to describe the observer preference distribution, however larger numbers of preference measures can also be used by the MDOF metric.

As described below, the MFAM arrangement is a method to adjust a transformed image according to two aspects (such as contrast and luminance) to optimise (for example, maximise or minimise) the preference for the transformed image as measured by the MDOF metric.

Overview of the MFAM Arrangement

Figure 15A:
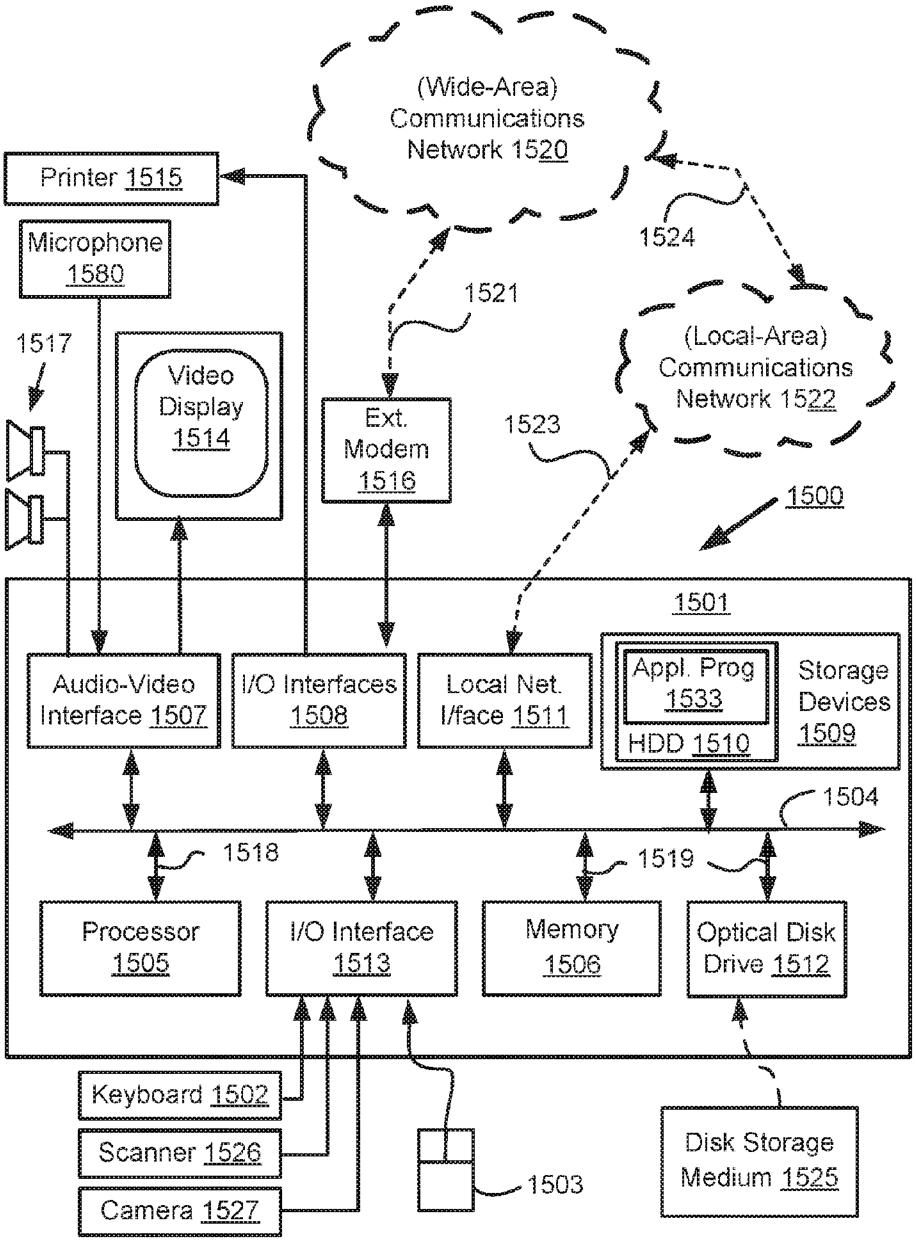
FIGS. 15A and 15B form a schematic block diagram of a general purpose computer system upon which arrangements described can be practiced.
Figure 15B:
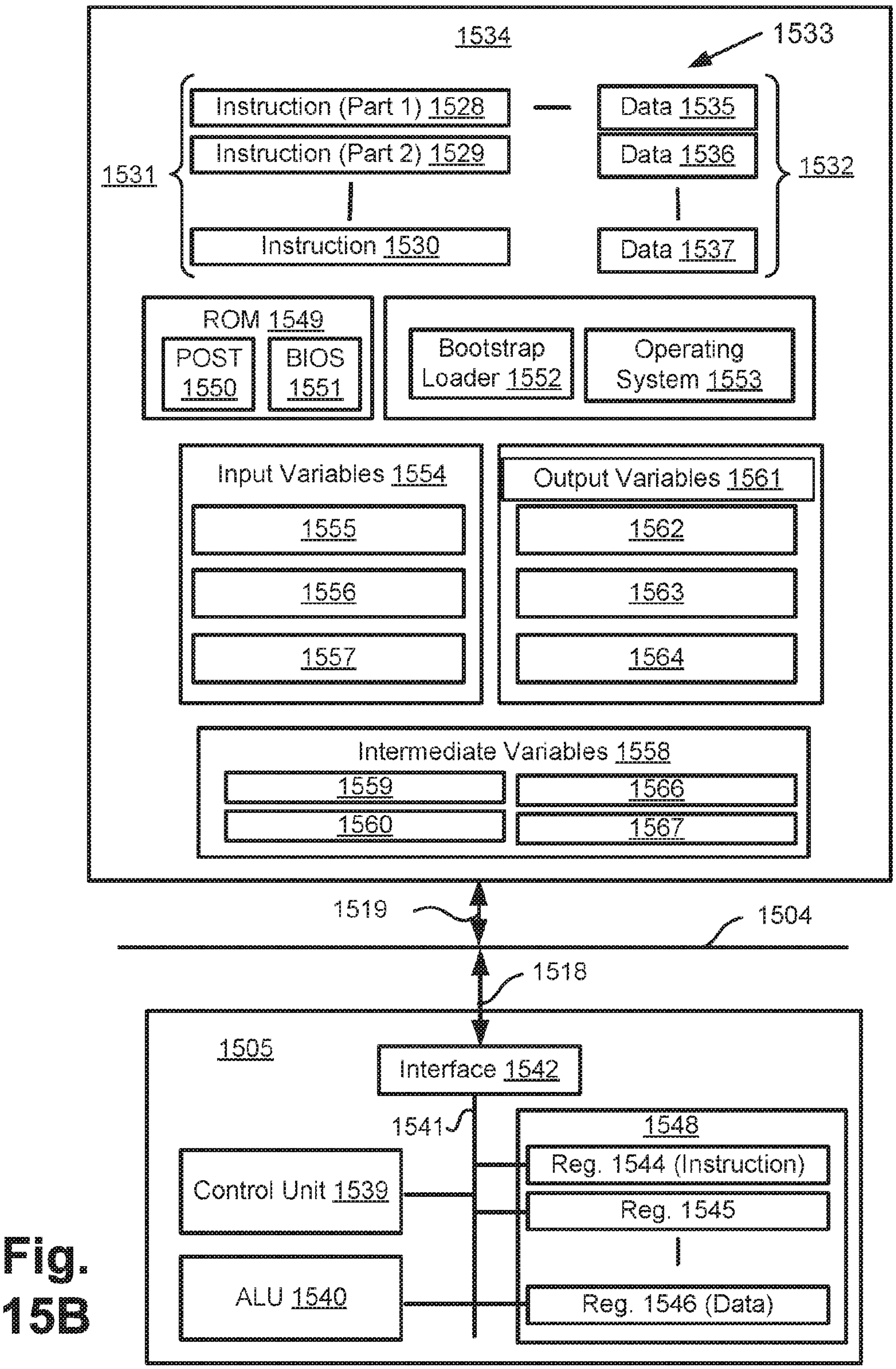

FIGS. 15A and 15B depict a general-purpose computer system 1500, upon which the various arrangements described can be practiced.

As seen in FIG. 15A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet circuit card, a Bluetooth® wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practised include IBM-PC's and compatibles, Sun Sparcstations, Apple Mac™ or like computer systems.

Figure 1:
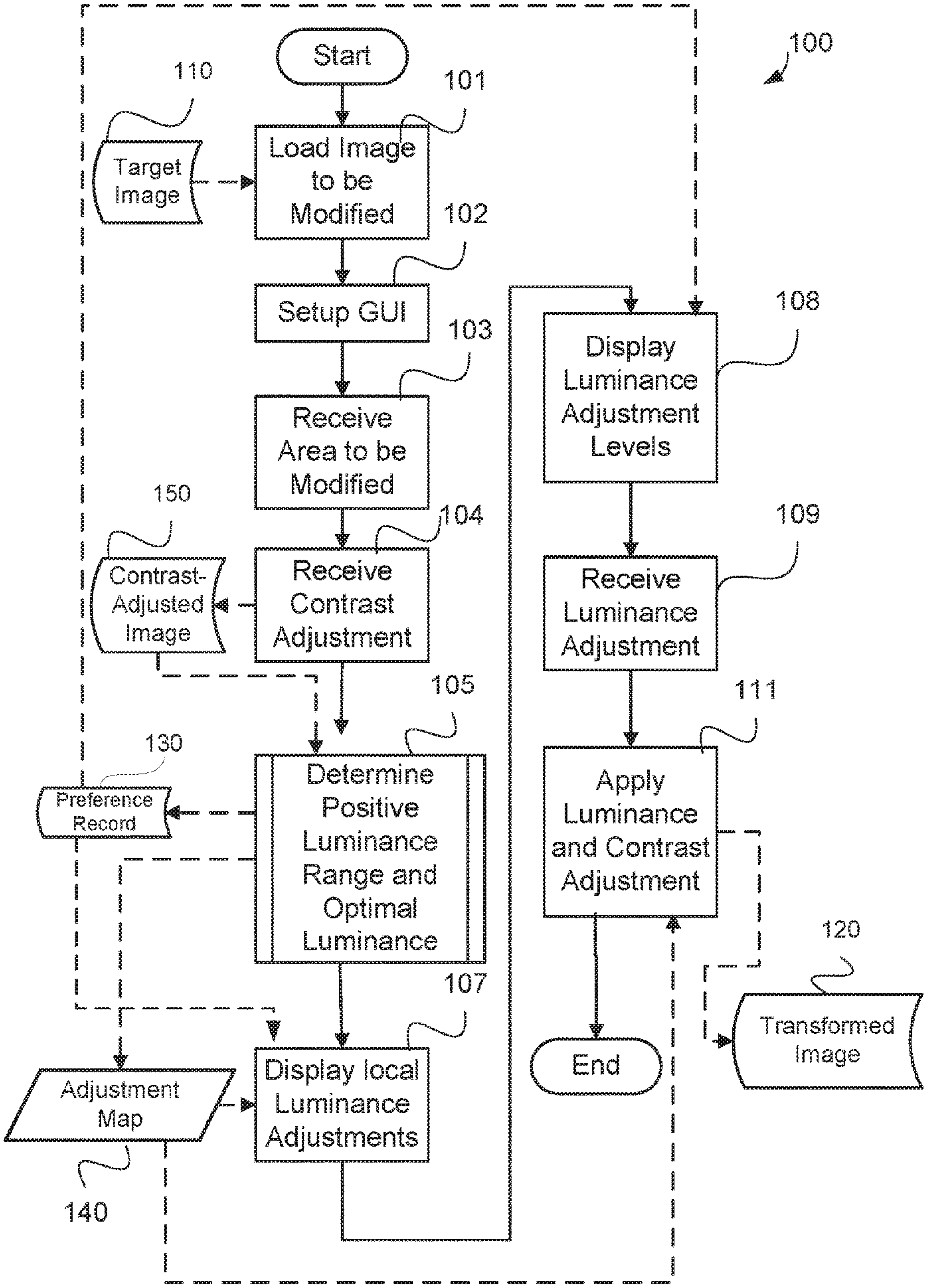
FIG. 1 is a schematic flow diagram illustrating a method of adjusting two aspects of an image according to one Multi-Factor Adjustment Method (MFAM) arrangement.

The method of displaying a suggested aspect adjustment may be implemented using the computer system 1500 wherein the processes of FIGS. 1 to 9, to be described, may be implemented as one or more software application programs 1533 executable within the computer system 1500. In particular, the steps of the method of FIG. 1 are effected by instructions 1531 (see FIG. 15B) in the software 1533 that are carried out within the computer system 1500. The software instructions 1531 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for the MFAM methods described.

The software 1533 is typically stored in the HDD 1510 or the memory 1506. The software is loaded into the computer system 1500 from a computer readable medium, and executed by the computer system 1500. Thus, for example, the software 1533 may be stored on an optically readable disk storage medium (e.g., CD-ROM) 1525 that is read by the optical disk drive 1512. A computer readable medium having such software or computer program recorded on it is a computer program product. The use of the computer program product in the computer system 1500 preferably affects an apparatus for implementing the methods of FIGS. 1 to 9.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a “memory” 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processor 1505, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548, sometimes called a cache memory. The cache memory 1548 typically includes a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1505 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The disclosed arrangements use input variables 1554, which are stored in the memory 1534 in corresponding memory locations 1555, 1556, 1557. The described arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises:

a fetch operation, which fetches or reads an instruction 1531 from a memory location 1528, 1529, 1530;

a decode operation in which the control unit 1539 determines which instruction has been fetched; and an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 1 to 9 is associated with one or more segments of the program 1533 and is performed by the register section 1544, 1545, 1547, the ALU 1540, and the control unit 1539 in the processor 1505 working together to perform the fetch, decode, and execute cycles for every instruction in the instruction set for the noted segments of the program 1533.

The method of FIGS. 1 to 9 may alternatively be implemented in dedicated hardware such as one or more integrated circuits performing the functions or sub functions of the described arrangements. Such dedicated hardware may include graphic processors, digital signal processors, or one or more microprocessors and associated memories.

In the context of the MFAM arrangements described, an "aspect" of an image that can be adjusted is a basic image processing operation such as luminance adjustment, contrast adjustment, sharpness adjustment, noise filtering or addition, or chroma adjustment. In the description below, the first aspect is contrast adjustment and the second aspect is luminance adjustment, however any two aspects listed above that interact with each other to affect the preference for the transformed image can be used in the MFAM arrangement. The meaning of the phrases "interact with each other" and "affect the preference for the transformed image" are defined below.

The MFAM arrangement described suggests an adjustment of a second aspect of an image in response to a user-input change to a first aspect an image. The MFAM arrangement suggests an adjustment of the second aspect of the image to create the transformed image that maximises the preference for the transformed image. In the MFAM arrangement described, preference for the transformed image is quantified using the MDOF system, and the adjustment performed to the second aspect is motivated by the formulae used to calculate preference using the MDOF system. Hence, in order to aid in the description of the MFAM arrangement, a brief overview of the MDOF arrangement is now described. The MDOF system is described hereafter in greater detail with reference to FIG. 4.

The MDOF system takes a target image and a transformed image and determines a preference distribution as described above and shown in FIGS. 10A and 10B. The preference distribution is computed (determined) from a statistics derived from the target image and transformed image. The statistics are derived by computing a salience map from the target image and a series of content masking maps. The salience map quantifies where a user is expected to look when viewing an image for each pixel in the target image and will be described in greater detail later with reference to FIG. 5. There is one content masking map for each image aspect considered by the MDOF system. The aspects considered by the MDOF system in the arrangements described are:

Sharpness,
Contrast,
Luminance,
Chroma, and
Noise.

For each of these aspects one or more content masking maps are determined. Each content masking map quantifies the degree of difference that a user would perceive between the target image and the transformed image for each pixel in the target image and transformed images. Content masking maps will be described in more detail below with reference to FIGS. 6 and 7, however, the content masking maps used by the MDOF method can be summarised as:

MS_L: A luminance content-masking map based on the MS-SSIM image difference metric. This will be described in more detail with reference to FIG. 6.

MS_C: A contrast content-masking map based on the MS-SSIM image difference metric. This is described in more detail with reference to FIG. 6.

MS_S: A structure (sharpness) content-masking map based on the MS-SSIM image difference metric. This is described in more detail with reference to FIG. 6.

CUS_CONT: A content masking map for measuring contrast. This is described in more detail with reference to FIG. 6.

CUS_LUM: A content masking map for measuring luminance. This is described in more detail with reference to FIG. 6.

CUS_NS: A content masking map for measuring noise. This is described in more detail with reference to FIG. 6.

CIS_CR: A content masking map for measuring chroma. This is described in more detail with reference to FIG. 7.

The MDOF method extracts a set of summary statistics from the content masking maps, the target image, transformed image and the salience map. The summary statistics summarise information about each of the content masking map and the salience map that is required to determine observer preference measure values, and which make up the observer preference measure value distribution. The summary statistics may include the mean values of the salience map and the content masking maps, measures of variation and structure within the salience map and each of the content masking maps, correlation between the salience map and each of the content masking maps, mutual information between the salience map and the content masking maps, or other appropriate statistics, as will be described below with reference to FIG. 8.

In the MFAM arrangements described, the following summary statistics specific to the salience map are determined and set out in the following Table of Statistics (Table 1):

TABLE 1

| Summary Statistics Specific to a Salience Map | |
|---|---|
| SM_coverage | A measure of what percentage of the target image contains salient objects: $$\sum_{i=1}^{M}\sum_{j=1}^{N} SM(i, j)/MN$$ |

TABLE 1-continued

| Summary Statistics Specific to a Salience Map | |
|---|---|
| | where M is the number of rows in the target image and N is the number of columns and SM(i, j) is a salience map 360 (see FIG. 3 and 4). |
| SM_entropy | The entropy of the salience map: $$-\sum_{j=1}^{J} hSM(j)\log hSM(j)$$ where hSM(j) is the value of the jth bin of the histogram (normalised to a sum of unity) of the values of the salience map 360 and J is the number of bins in the histogram (chosen to be 100 in this example). |

It is noted, however, that there are many other statistics that may be determined from the salience map. Other examples include the variance, skew, kurtosis or mean of the values of the salience map.

In one described MFAM arrangement, the following summary statistics specific to each content masking map are determined, as set out in the following Second Table of Statistics (Table 2):

TABLE 2

| Summary Statistics Specific to Each Content Masking Map | |
|---|---|
| CMmap_mean | The mean value of the content masking map. |
| CM_entropy | The entropy of the content masking map: $$-\sum_{j=1}^{J} hCM(j)\log hCM(j)$$ where hCM(j) is the value of the jth bin of the histogram (normalised to a sum of unity) of the values of the content masking map and J is the number of bins in the histogram (chosen to be 100 in this example). |

The statistics in Table 2 are determined for each of the content masking maps. There are many other statistics that may be determined from the content masking maps. Other examples include the variance, skew, kurtosis or mean of the values of each of the content masking maps.

In the described MFAM arrangements, the following joint summary statistics that quantify the similarity of each of the content masking maps and the salience map are determined, as set out in the following Third Table of Statistics (Table 3):

TABLE 3

| Summary Statistics that Quantify the Similarity of Each of the Content Masking Maps and the Salience Map | |
|---|---|
| WCMmap_mean | The weighted mean value of the content masking map, where the weighting is by the image salience. For a target image of M rows and N columns, this is determined by: $$\sum_{i=1}^{M}\sum_{j=1}^{N} SM(i,j)CM(i,j) \Big/ \sum_{i=1}^{M}\sum_{j=1}^{N} SM(i,j)$$ |

TABLE 3-continued

| Summary Statistics that Quantify the Similarity of Each of the Content Masking Maps and the Salience Map | |
|---|---|
| | where SM(i, j) is the (i, j)th pixel of the salience map 360 of the target image, CM(i, j) is the (i, j)th pixel of the content masking map of the target image. |
| WCM_sal_meanratio | The ratio of the salience weighted mean of the content masking map over the unweighted mean content masking map: WCMmap_mean/CMmap_mean |
| CM_SM_corr | The two-dimensional linear correlation coefficient between the salience map and the content masking map and/or between regions of the salience map and regions of the content masking map. |
| WCM_sal_sumratio | The ratio of the sum of the values of the salience weighted content masking map over the sum of the values of the unweighted content masking map. |

The statistics in Table 3 are determined for each of the content masking maps. There are, however, many other joint statistics that may be determined to quantify the similarity between the content masking maps and the salience map in the MDOF system. Other examples include measures of mutual information or earthmovers distance between the content masking maps and the salience map. In computer science, the earth mover's distance (EMD) is a measure of the distance between two probability distributions over a region D. In mathematics, this is known as the Wasserstein metric.

There are, however, many other statistics that may be determined by the MDOF system. Other examples include the variance, skew, kurtosis or mean of the values of different components of the target image. In addition, various statistics may be extracted from the transformed image. Furthermore, information relating to an individual user or group of users may be extracted at this point allowing the observer preference distributions to be tailored to the preference behaviour of individual users or groups of users.

The summary statistics are also used by the MDOF system to determine high-level features that are summed and monotonically transformed to compute the preference distribution.

A "high-level feature" is a simple combination of one or more summary statistics of an image. As described above, a "summary statistic" is a quantity computed using the pixels of the salience map, the target image or the transformed image or both, or the content masking maps. A "summary statistic" reduces the information contained in the pixels of either (or all of) the salience map, the target image, the transformed image or content masking maps into low dimensional quantities (between one and a few dozen numbers) that summarise chroma, sharpness, contrast, noise and luminance aspects of the target image and the transformed image Summary statistics contain only information from one of the aspects (sharpness, contrast, luminance, chroma, noise) modified between the target and transformed images. A "simple combination of one or more summary statistics" refers to simple functions of the summary statistics such as multiplying two statistics together or taking the square of the summary statistic. As examples of the aforementioned "simple function", in the described MFAM arrangement the high-level feature terms in the MDOF system can be individual summary statistics, the square of summary statistics or multiplications of two summary statistics. However, alternative high-level features can also be used in an MFAM arrangement including cubed summary statistics, multiplications of more than two summary statistics or non-linear functions of one or more summary statistics. Although the summary statistics contain information regarding only one of the aspects considered by the MDOF system, the high-level features may contain features that encode interactions of two or more aspects. For example, a high level feature might encode the interaction between contrast and luminance modifications between the target image and transformed image and how that interaction affects the preference for the transformed image. When modifying the contrast of the transformed image, the MFAM arrangement uses this interaction information to find the optimal adjustment to the luminance of the transformed image to maximise preference for the transformed image. Concrete lists of high-level features used by the MFAM system will be described hereafter.

FIG. 1 is a schematic flow diagram illustrating a method 100 of adjusting a first and second aspect of an image to obtain an optimally preferred image according to one MFAM arrangement. The method 100 is typically implemented as one or more modules of the application 1533 stored in the memory 1506 and controlled by execution of the processor 1505. In FIG. 1 (and similarly in FIGS. 2-9), inputs and outputs of data and parameters are indicated by dashed arrows.

The method 100 starts at a loading step 101. In execution of the loading step 101, a target image 110 that the user intends to modify is loaded to the computer module 1501. In some arrangements, the target image 110 may be stored on a memory of the computer module 1501, such as the memory 1506, transmitted to the module 1501 via the network 1520, or read by the optical disk drive 1525. In yet other arrangements, the image may be captured by image capture hardware installed on the module 1501.

The method 100 then proceeds under execution of the processor 1505 to a setup step 102. In execution of the setup step 102, a Graphical User Interface (GUI) for modifying first and second aspects (in the example described, contrast and luminance respectively) is set up and displayed to the user, such as via the display 1514. In the MFAM arrangements described, the GUI is set up to form a display shown in FIG. 12.

Figure 12:
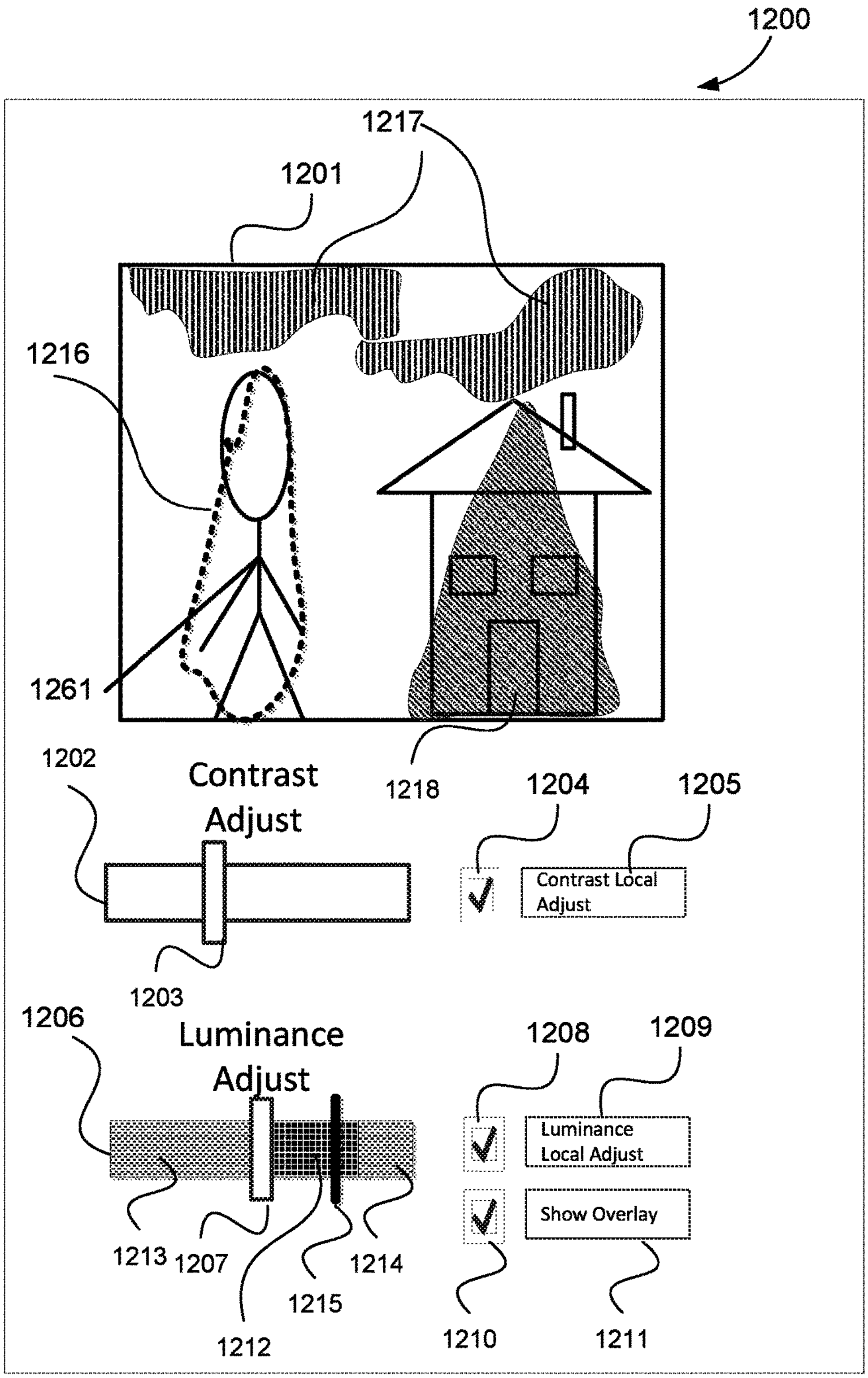
FIG. 12 is a representation of a GUI for modifying two aspects of an image according to one MFAM arrangement.

FIG. 12 shows a GUI display 1200 according one MFAM arrangement. The GUI display 1200 is shown on the video display 1514. The GUI display 1200 shows a current working image 1201 which is initially the target image 110 after execution of the setup step 102. The GUI display 1200 also shows an adjustment control 1202 for a first aspect of the image (contrast in the case FIG. 12) with a slider bar 1203 indicating the current status of the contrast adjustment of the target image 110. Immediately after execution of the setup step 102, the user will not have input a contrast adjustment. The slider bar 1203 may indicate "no contrast adjustment" in such an instance. A position of the slider bar 1203 in such an instance may correspond to the centre of the contrast slider bar 1202. Moving the slider 1203 to the left would indicate that the user wants to decrease contrast in all or part of the image. Moving the slider 1203 to the right would indicate that the user wants to increase contrast in all or part of the image. The GUI display 1200 also includes a check box 1204 that the user can operate to indicate whether the user wishes to adjust contrast locally or globally for the target image 110. Checking the checkbox 1204 indicates that the user wishes to change contrast in local regions of the target image 110. Unchecking the checkbox 1204 indicates that the user wishes to change contrast globally across the target image 110. A label 1205 indicates the function of checkbox 1204 to the user.

The GUI display 1200 also shows an adjustment control 1206 for a second aspect of the image (luminance in the case of FIG. 12) with a slider bar 1207 indicating the current status of the luminance adjustment of the target image 110. Immediately after execution of the setup step 102, the user will not have input a luminance adjustment. The slider bar 1207 may indicate "no luminance adjustment" in such an event. A position of the slider bar 1207 in such an instance may correspond to the centre of the luminance control 1206. Moving the slider 1207 to the left would indicate that the user wants to decrease luminance in all or part of the image. Moving the slider 1207 to the right would indicate that the user wants to increase luminance in all or part of the image. The GUI display 1200 also includes a check box 1208 that the user can operate to indicate whether the user wishes to adjust luminance locally or globally for the target image 110. Checking the checkbox 1208 indicates that the user wishes to change luminance in local regions of the target image 110. Unchecking the checkbox 1208 indicates that the user wishes to change luminance globally across the target image 110. A label 1209 indicates the function of checkbox 1208 to the user.

The GUI display 1200 also includes a check box 1210 that the user can operate to indicate whether the user wishes to view local areas of luminance adjustment as an overlay on the current working image 1201 or wishes to have this information hidden. Checking the checkbox 1210 indicates that the user wishes to see an overlay indicating luminance adjustments in local regions of the target image 110. Unchecking the checkbox 1210 indicates that the user wishes to not see the overlay. Label 1211 indicates the function of checkbox 1210 to the user.

FIG. 12 shows the GUI display 1200 according to one arrangement of the MFAM system, however other GUI implementations are possible. For example, the interactive elements of the GUI and corresponding labels might be moved to different positions, the luminance adjustment control 1206 might be hidden until the user makes a contrast adjustment. Alternatively, the contrast adjustment control 1202 and the luminance adjustment control 1206 might be merged into a single adjustment control where a single slider control sits in the centre of the large box. Moving the single slider up and down might signify luminance adjustments, while moving the single slider left or right might signify contrast adjustments (or vice versa).

In one arrangement, the GUI controls (1202, 1206, 1204, 1208 and the like) may be visible before an image is loaded. In another arrangement, the GUI controls may be partly or fully hidden until an image is loaded. In yet another arrangement, the GUI might contain controls to load an image to be modified, save an image that has been modified or revert changes made to an image that is in the process of being modified.

Referring back to FIG. 1, the method 100 then proceeds under execution of the processor 1505 from the setup step 102 to a receiving step 103. In execution of the receiving step 103, the user indicates a region of the target image 110 to apply a local contrast adjustment to. In one MFAM arrangement, the user draws on the current working image 1201 with an input such as the computer mouse 1503, a stylus (not shown) or by touching a touch-sensitive display (not shown). The user draws on the image 1201 to indicate a region 1216 of the target image 110 to apply a local contrast adjustment to, as shown in FIG. 12. The contrast adjustment region 1216 may be indicated by moving the mouse 1503, the stylus or a finger on a touch screen to encircle the contrast adjustment region 1216. Alternatively, the user can click the mouse 1503, the stylus or touch the finger somewhere within the region 1216 and the MFAM arrangement uses image segmentation technology to automatically determine contrast adjustment region 1216. Step 103 would then execute to indicate the user's selection of contrast adjustment region 1216 by a line or pattern around the region (such as shown in FIG. 12) or by some other indication such as an overlay or flashing region and the like or, in some implementations, no indication at all. In the case that the user has unchecked the checkbox 1204, then the contrast adjustment region may be taken to be the entire current working image 1201.

Returning to FIG. 1, the method 100 then proceeds under execution of the processor 1505 from the receiving step 103 to a receiving step 104. In execution of the receiving step 104, the method 100 waits for the user to indicate a contrast adjustment to be applied to the contrast adjustment region 1216. In one MFAM arrangement, the user indicates the contrast adjustment by moving the contrast adjustment slider 1203 along the control 1202. Once the user has finished moving the contrast adjustment slider 1203, step 104 records the contrast adjustment indicated by the user. For example, the contrast adjustment indicated by the user may be stored in a temporary portion of the memory 1506. In one MFAM implementation, the current working image 1201 is modified by adjusting the contrast in the contrast adjustment region 1216 according to the contrast adjustment. The output of receiving step 104 is the contrast adjusted image 150. In receiving an indication 1261 and adjustment of the control 1202, receiving step 104 operates to receive and apply a contrast adjustment of a first region of the image. As discussed below in relation to FIG. 2, the contrast adjustment defines a preference for the contrast adjusted image on the part of the user.

The method 100 then proceeds under execution of the processor 1505 from the receiving step 104 to a determining step 105. In execution of the determining step 105, a map of local luminance adjustments 140 for the current working image 1201 is generated. The adjustment map 140 relates to a pixel map of the region to which luminance adjustments are to be applied. The adjustment map 140 contains positive values in regions of the target image 110 where the MFAM system suggests that the luminance be increased, and negative values in regions of the target image where the MFAM system suggests that the luminance be decreased. The magnitude of the values of the adjustment map 140 indicate the degree of luminance change suggested for each pixel in a contrast adjusted image 150. Larger magnitude values in the adjustment map 140 indicate stronger adjustments to luminance are suggested for the contrast adjusted image 150. The adjustment map 140 does not indicate an absolute luminance adjustment applied to each pixel, rather relative differences or a degree of change in suggested luminance adjustments between pixels in the contrast adjusted image 150. The adjustment map 140 effectively determines one or more regions to which a luminance adjustment is to be applied. For example, regions 1217 and 1218 of FIG. 12 may represent regions of the image 1201 in which luminance adjustments are identified by the adjustment map 140.

The adjustment map 140 is multiplied by a global luminance adjustment value input via the luminance adjustment slider 1207 (FIG. 12) to determine a final luminance adjustment for the contrast adjusted image 150. Determination of a final luminance adjustment is applied in an application step 111, described below. In addition, a preference record 130 is generated in execution of determination step 105. The preference record 130 represents an estimated or expected preference of the user for each of a range of luminance adjustments. The preference record 130 comprises an entry for every luminance adjustment that the user may select via the luminance adjustment slider 1207. For each entry, the predicted preference for a transformed image 120 when compared to the target image 110 is recorded by the application 1533. The transformed image relates to the contrast adjusted image with a potential luminance adjustment applied. The predicted preference is determined by the application 1533 comparing the target image 110 to the transformed image 120 once both the contrast adjustment received in step 104 and the luminance adjustment in the preference record 130 have been applied to the target image 110 to create a transformed image 120. Operation of a method 200 for determining positive luminance range and optimal luminance, as implemented at determination step 105 is described more fully with reference to FIG. 2.

The method 100 then proceeds under execution of the processor 1505 from determination step 105 to a display step 107. In execution of the display step 107, the map of local luminance adjustments 140 is displayed in associated with the contrast adjusted image (or the working image). For example, the luminance adjustments may be displayed as an overlay on the current working image 1201. In one MFAM arrangement, the overlaying is implemented by placing an overlay on the current working image 1201 that brightens pixels with positive values of the adjustment map 140 and darkens pixels with negative values of the adjustment map 140. Other methods might be used for implementing the display step 107, including changing colours of pixels in the current working image 1201 to indicate positive and negative adjustment map 140 values, alternating the current working image between the contrast adjusted image 150 and the contrast adjusted image 150 with the suggested luminance changes applied according to the adjustment map 140 and the preference record 130 entry that maximises the preference for the transformed image.

Referring to FIG. 12, the regions 1217 and 1218 may also represent an overlay or visual indication displayed on the image 1201. An overlay is normally displayed on a contrast adjusted image, such as the image 150. The overlay may represent types of adjustment—for example shading differences between the regions 1217 and 1218 may indicate that luminance value increases are required in the region 1217 and luminance decreases in the region 1218.

In other arrangements, the luminance adjustments displayed at step 107 are determined based upon the preference record 130. In such arrangements, the luminance adjustments to be displayed or suggested is determined based upon a preference of a corresponding transformed image, typically relating to a corresponding transformed image having a highest associated preference.

The method 100 then proceeds under execution of the processor 1505 from the display step 107 to a display step 108. In execution of the display step 108 the effects that adjustments to the global luminance adjustment value have on the predicted preference for the transformed image are indicated to the user using a visual indicator. For example, an overlay of a high preference suggestion may be displayed, such the suggested adjustment applied to the contrast adjusted image 150 has a preference greater than the preference of the contrasted adjusted image 150.

In another MFAM arrangement, indication of a suggested luminance adjustment is achieved by modifying the luminance adjustment control 1206 based on the values stored in the preference record 130. In such an MFAM arrangement a range of luminance adjustment values on the luminance adjustment control 1206 that would result in a preference for the transformed image 120 that would be greater than the preference for the contrast adjusted image 150 are indicated, to the user, for example in a green area 1212. The range of luminance adjustments indicated by the area 1212 are determined to have positive preferences of the contrast adjusted image with the luminance adjustments of the range applied. A range of overly low luminance adjustment values that would result in a greater preference for the contrast adjusted image 150 over the transformed image 120 would be indicated in another colour, such as a red area 1213. Similarly, overly high luminance adjustment values that would result in a greater preference for the contrast adjusted image 150 over the transformed image 120 would also be indicated in a red area 1214. Other ways to indicate luminance adjustments (or ranges of adjustments) with positive (1212) or negative effects (1213 and 1214) on the preference for the transformed image include causing those luminance values to flash at particular frequencies in the luminance adjustment control 1206, or by listing the luminance adjustment values that form the boundaries between the positive preference area 1212 and the negative preference areas 1213 and 1214. The range of luminance adjustments indicated by the area 1212 are determined to have positive preferences of the contrast adjusted image with the luminance adjustments of the range applied. Similarly, the range of luminance adjustments indicated by the areas 1213 and 1214 are determined to have negative preferences of the contrast adjusted image with the luminance adjustments of the range applied.

The suggested luminance adjustment represents a degree of change of a luminance setting relating to each pixel of the appropriate region, as described in relation to the adjustment map 140.

In the described MFAM arrangements, execution of the display step 108 also modifies display of the luminance adjustment control 1206 to indicate the optimal luminance adjustment value. The optimal luminance adjustment value is the adjustment of the plurality of luminance adjustment values of the preference records 130 that produces the greatest predicted preference for the transformed image 120 according to the preference record 130. In one MFAM arrangement is indicated a marker 1215 on the luminance adjustment control in the position of the optimal luminance adjustment value. In alternative arrangements, the optimal luminance adjustment value could be indicated in a different way including printing the numerical value or shading part of the luminance adjustment control 1206 in a different colour to indicate the position of the control corresponding to the optimal luminance adjustment value.

In some implementations, one of the displaying steps 107 and 108 may be omitted. For example, step 107 may be omitted and the luminance adjustment suggestion may be displayed with reference to global luminance adjustment levels only, as per step 108. Alternatively, step 108 may be omitted and the luminance adjustment suggestion displayed as a local luminance adjustment, such as by modification of the control 1206 described above. Each of steps 107 and 108 relate to displaying a visual indication of a suggested luminance adjustment, the suggested adjustment being based upon a preference of the contrast adjusted image with the suggested adjustment applied (transformed image).

In using the preference record 130 to display the suggested annotation, the display step 108 effectively determines a luminance adjustment based upon preference expected by the user. The determined luminance adjustment is effectively based upon at least one of one contrast applied to the first region 1216 and saliency associated with at least the second regions 1217 and 1218 in the salience map of the image, as described in relation to FIG. 4.

The method 100 then proceeds under execution of the processor 1505 from the display step 108 to a receiving step 109. In execution of the receiving step 109, the method 100 waits for the user to indicate a global luminance adjustment to be applied to the contrast adjusted image 150. In one MFAM arrangement, the user indicates the global luminance adjustment by moving the luminance adjustment slider 1207 along the control 1206. The computer module 1501 receives the luminance adjustment. Once the user has finished moving the luminance adjustment slider 1207, step 109 records the received global luminance adjustment indicated by the user.

The method 100 then proceeds under execution of the processor 1505 from the receiving step 109 to the application step 111. Execution of the application step 111 applies an adjustment process associated with each pixel in the adjustment map 140 as determined by the step 105, on a pixel-by-pixel basis to the contrast adjusted image 150 to create the transformed image 120.

In the described MFAM arrangements, the modification applied to the contrast adjusted image 150 by the execution of the application step 111 in order to create the transformed image 120 is a luminance modification. The adjustment map 140 specifies the sign and relative scaling of luminance adjustments to be applied to the contrast adjusted image 150. The global luminance adjustment indicated by the user during step 109 provides the absolute scaling of the luminance adjustment to be provided to the contrast adjusted image 150 by the step 111 in order to create the transformed image 120. For example, if the global luminance adjustment is 1.3 then a value of 1.3 is multiplied with every pixel of the adjustment map 140 to obtain the adjustment process applied to each pixel of the contrast adjusted image 150 by the step 111 in order to create the transformed image 120. In this example, the step 111 applies the adjustment process to the current working image 1201 to form the transformed image 120 (also referred to as an enhanced image). The transformed image 120 is formed by converting the contrast adjusted image 150, which is in sRGB colour space, to CIELCh space and adding to the L component value of each pixel the value of the corresponding pixel in the adjustment map 140 multiplied by the luminance adjustment indicated by the user in step 109. The transformed image 120 is then converted back into the sRGB colour space.

In the described MFAM arrangements, luminance is adjusted in the transformed image 120. However, other aspects considered by the MDOF may be adjusted using the arrangements described. For example, if the MFAM arrangement is being used to improve the contrast and chroma of an image then the adjustment map 140 can describe chroma adjustment values for each pixel. In this case, the adjustment map 140 would not be added to the chroma channel of the contrast adjusted image 150, but rather multiplied with the chroma channel of the contrast adjusted image 150 to create the transformed image 120. In another example, the other aspects considered in the MFAM arrangement might be aspects to do with high dynamic range (HDR) rendering of an image, such as tone-curve adjustment and luminance of different parts of a HDR image or the collection of images used to construct a HDR image.

A Method to Compute the Positive Luminance Range and Optimal Luminance

Figure 2:
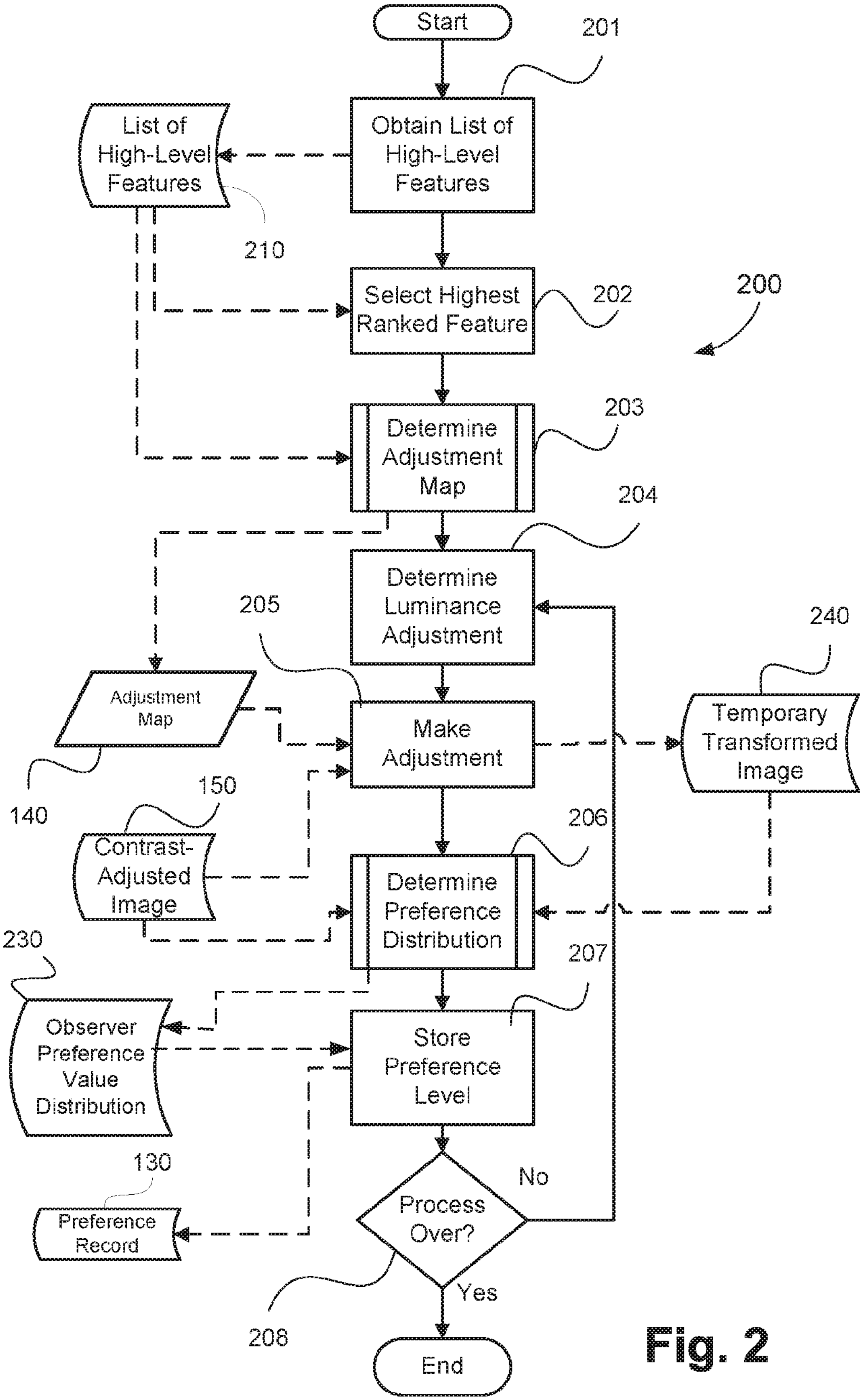
FIG. 2 is a schematic flow diagram illustrating a method of determining an adjustment of a second aspect of an image in response to the adjustment of a first aspect according to one MFAM arrangement.

FIG. 2 is a schematic flow diagram illustrating the method 200. The method 200 is typically implemented as one or more modules of the application 1533 stored in the memory 1506 and controlled by execution of the processor 1505. Execution of the method 200 produces the map of local luminance adjustments 140 for the contrast adjusted image 150 and the preference record 130 according to step 105 of the method 100. The preference record 130 and the map 140 may be stored in the memory 1506.

The preference record 130 has an entry for every luminance adjustment that the user may select via the luminance adjustment slider 1207. For each entry of the preference record 130, the predicted preference for the transformed image 120 when compared to the target image 110 is recorded. The predicted preference is computed by comparing the target image 110 to the transformed image 120 once both the contrast adjustment received in step 104 and the luminance adjustment in the preference record 130 has been applied to the target image 110 to create the transformed image 120.

The method 200 starts at an obtaining step 201. In execution of the obtaining step 201, a list of high-level features 210 is obtained by the application 1533. The high-level features are terms computed by the MDOF system to compute the preference distribution. The terms can be obtained from a psychophysical experiment such as that described hereafter, and stored on, and obtained from, the memory 1506. The list of high-level features 210 contains three pieces of information in each entry:

- Description of the high-level feature: A description of the high-level feature that includes which content masking maps contribute to the feature, how the content masking maps contribute to the high-level feature and how salience information contributes to the high-level feature. The information is used in execution of step 203 to determine the adjustment map 140 and will be described in more detail below.
- Coefficient of the high-level feature in the MDOF system: The weighting of the high-level feature in the MDOF. The coefficient information will be used in execution of step 203 to determine the adjustment map 140, and will be described in more detail below.
- Ranking of the high-level feature in the MDOF system: The ranking of the high-level feature is a measure of the contribution that the high-level feature makes to the preferences for the transformed image compared to the target image. Step 203 uses the ranking information to determine an adjustment map 140 that has a greatest ability to increase the user preference for the transformed image 120. Step 203 implements this by selecting an adjustment map 140 that affects the highest ranked high-level feature strongly. There are a number of ways to determine the ranking of the high-level features in the MDOF system. In the described MFAM arrangements, the coefficient of the high-level feature in the MDOF system is multiplied by the variance of the values the high-level feature attained during the psychophysical experiment that determined which high-level features were used by the MDOF system. Such quantifies the variance that a particular high-level feature contributes to the MDOF system when calculating the preference for the transformed image 120 over the target image 110. An alternative method is to use the magnitudes of the coefficients of the high-level features in the MDOF system as the ranking of the high-level feature.

Table 4 below shows a list of high-level features 210 used by the method 200 in the MFAM arrangements described. The high-level features selected for the list of the high-level features 210 in the described MFAM arrangements are those used in steps 460 to 470 of a method 400, shown in FIG. 4, to determine the log ratio of the preference for the transformed image 120 over the preference for the target image 110. The high-level features are chosen as the high-level features directly describe the preference for the transformed image 120 However, other selections of high-level features may be used, including the union of the high-level features used to compute the log ratio of the preference for the transformed image 120 over the preference for the target image 110 and the high-level features used to compute the "no preference" bin in the MDOF system. Further details of high-level features used in the MDOF system are described hereafter in reference to FIG. 4.

TABLE 4

List of High-level Features (the second row is placed in Table 4 to aid in understanding and is not required for the method 200):

| High-Level Feature Description | High-Level Feature Detailed Description | Coefficient | Ranking |
|---|---|---|---|
| CIS_CR_CMmap_mean | Summary statistic as described in Tables 1, 2 and 3 extracted from the CIS_CR content masking map. | −0.916 | 1 |
| MS_C_WCMmap_mean * MS_C_CM_SM_corr | Product of summary statistics as described in Tables 1, 2 and 3 extracted from the MS_C content masking map and the salience map. | 14.9 | 2 |
| $(CUS\_LUM\_CM\_entropy)^2$ | Squared summary statistic as described in Tables 1, 2 and 3 extracted from the CUS_LUM content masking map. | 0.0174 | 3 |

TABLE 4-continued

List of High-level Features (the second row is placed in Table 4 to aid in understanding and is not required for the method 200):

| High-Level Feature Description | High-Level Feature Detailed Description | Coefficient | Ranking |
|---|---|---|---|
| CUS__CONT__CM__SM__corr * CUS__LUM__CM__SM__corr | Product of summary statistics as described in Tables 1, 2 and 3 extracted from the CUS__CONT content masking map, CUS__LUM content masking map and the salience map. | 1.78 | 4 |
| CUS__NS__WCMmap__mean * CUS__NS__CM__SM__corr | Product of summary statistics as described in Tables 1, 2 and 3 extracted from the CUS__NS content masking map and the salience map. | −138 | 5 |
| CUS__CONT__CM__SM__corr * MS__L__WCMmap__mean | Product of summary statistics as described in Tables 1, 2 and 3 extracted from the CUS__CONT content masking map, MS__L content masking map and the salience map. | 22.9 | 6 |
| CUS__NS__CM__SM__corr * MS__L__WCM__sal__sumratio | Product of summary statistics as described in Tables 1, 2 and 3 extracted from the CUS__NS content masking map, MS__L content masking map and the salience map. | 1.83 | 7 |
| CUS__LUM__WCMmap__mean * MS__S__WCM__sal__sumratio | Product of summary statistics as described in Tables 1, 2 and 3 extracted from the CUS__LUM content masking map, MS__S content masking map and the salience map. | 6.44 | 8 |
| CUS__LUM__CM__entropy * MS__C__WCMmap__mean | Product of summary statistics as described in Tables 1, 2 and 3 extracted from the CUS__LUM content masking map, MS__C content masking map and the salience map. | 0.594 | 9 |
| $(\text{CUS\_\_LUM\_\_CMmap\_\_mean})^2$ | Squared summary statistic as described in Tables 1, 2 and 3 extracted from the CUS__LUM content masking map. | 35.4 | 10 |

TABLE 4-continued

List of High-level Features (the second row is placed in Table 4 to aid in understanding and is not required for the method 200):

| High-Level Feature Description | High-Level Feature Detailed Description | Coefficient | Ranking |
|---|---|---|---|
| CUS_LUM_WCMmap_mean * MS_L_WCMmap_mean | Product of summary statistics as described in Tables 1, 2 and 3 extracted from the CUS_LUM content masking map, MS_L content masking map and the salience map. | −118.2 | 11 |
| CUS_CONT_CM_SM_corr * MS_L_CMmap_mean | Product of summary statistics as described in Tables 1, 2 and 3 extracted from the CUS_CONT content masking map, MS_L content masking map and the salience map. | 16.4 | 12 |
| CUS_LUM_CM_SM_corr * MS_C_CMmap_mean | Product of summary statistics as described in Tables 1, 2 and 3 extracted from the CUS_LUM content masking map, MS_C content masking map and the salience map. | 11.5 | 13 |
| MS_C_CM_SM_corr * MS_L_WCMmap_mean | Product of summary statistics as described in Tables 1, 2 and 3 extracted from the MS_C content masking map, MS_L content masking map and the salience map. | 22.3 | 14 |
| CIS_CR_CM_SM_corr * CUS_LUM_WCMmap_mean | Product of summary statistics as described in Tables 1, 2 and 3 extracted from the CIS_CR content masking map, CUS_LUM content masking map and the salience map. | −4.600 | 15 |
| CUS_LUM_CM_entropy * MS_C_WCM_sal_meanratio | Product of summary statistics as described in Tables 1, 2 and 3 extracted from the CUS_LUM content masking map, MS_C content masking map and the salience map. | 0.0375 | 16 |
| CUS_NS_CMmap_mean * CUS_NS_WCMmap_mean | Product of summary statistics as described in Tables 1, 2 and 3 extracted from the CUS_NS content masking map and the salience map. | 1733.0 | 17 |

TABLE 4-continued

List of High-level Features (the second row is placed in Table 4 to aid in understanding and is not required for the method 200):

| High-Level Feature Description | High-Level Feature Detailed Description | Coefficient | Ranking |
|---|---|---|---|
| CIS_CR_CM_entropy * MS_L_CMmap_mean | Product of summary statistics as described in Tables 1, 2 and 3 extracted from the CIS_CR content masking map, MS_L content masking map. | 0.559 | 18 |
| CUS_CONT_CM_SM_corr * MS_S_CM_SM_corr | Product of summary statistics as described in Tables 1, 2 and 3 extracted from the CUS_CONT content masking map, MS_S content masking map and the salience map. | −0.34 | 19 |
| CIS_CR_CMmap_mean * CUS_LUM_CM_entropy | Product of summary statistics as described in Tables 1, 2 and 3 extracted from the CIS_CR content masking map, CUS_LUM content masking map. | −0.0493 | 20 |
| CIS_CR_WCMmap_mean * CUS_LUM_WCMmap_mean | Product of summary statistics as described in Tables 1, 2 and 3 extracted from the CIS_CR content masking map, CUS_LUM content masking map and the salience map. | −4.88 | 21 |
| CIS_CR_WCM_sal_meanratio * CIS_CR_SM_entropy | Product of summary statistics as described in Tables 1, 2 and 3 extracted from the CIS_CR content masking map and the salience map. | −0.0573 | 22 |
| MS_C_WCMmap_mean * MS_S_CMmap_mean | Product of summary statistics as described in Tables 1, 2 and 3 extracted from the MS_C content masking map, MS_S content masking map and the salience map. | 48.7 | 23 |
| CUS_CONT_CMmap_mean * MS_C_CM_SM_corr | Product of summary statistics as described in Tables 1, 2 and 3 extracted from the CUS_CONT content masking map, MS_C content masking map and the salience map. | 5.22 | 24 |

TABLE 4-continued

List of High-level Features (the second row is placed in Table 4 to aid in understanding and is not required for the method 200):

| High-Level Feature Description | High-Level Feature Detailed Description | Coefficient | Ranking |
|---|---|---|---|
| MS_L_WCM_sal_sumratio * MS_S_CM_entropy | Product of summary statistics as described in Tables 1, 2 and 3 extracted from the MS_L content masking map, MS_S content masking map and the salience map. | −0.0401 | 25 |
| CUS_NS_WCMmap_mean * MS_L_CMmap_mean | Product of summary statistics as described in Tables 1, 2 and 3 extracted from the CUS_NS content masking map, MS_L content masking map and the salience map. | 298 | 26 |
| CUS_LUM_WCM_sal_meanratio * CUS_NS_WCM_sal_sumratio | Product of summary statistics as described in Tables 1, 2 and 3 extracted from the CUS_LUM content masking map, CUS_NS content masking map and the salience map. | −0.0240 | 27 |
| CUS_CONT_WCM_sal_sumratio * CUS_LUM_CM_SM_corr | Product of summary statistics as described in Tables 1, 2 and 3 extracted from the CUS_CONT content masking map, CUS_LUM content masking map and the salience map. | 0.202 | 28 |
| $(\text{CUS\_NS\_WCM\_sal\_meanratio})^2$ | Squared summary statistic as described in Tables 1, 2 and 3 extracted from the CUS_NS content masking map and salience map. | 0.00334 | 29 |
| CIS_CR_WCMmap_mean * CUS_LUM_WCM_sal_meanratio | Product of summary statistics as described in Tables 1, 2 and 3 extracted from the CIS_CR content masking map, CUS_LUM content masking map and the salience map. | −0.0323 | 30 |
| $(\text{CIS\_CR\_WCMmap\_mean})^2$ | Squared summary statistic as described in Tables 1, 2 and 3 extracted from the CIS_CR content masking map and salience map. | 0.294 | 31 |

TABLE 4-continued

List of High-level Features (the second row is placed in Table 4 to aid in understanding and is not required for the method 200):

| High-Level Feature Description | High-Level Feature Detailed Description | Coefficient | Ranking |
|---|---|---|---|
| CIS_CR_WCMmap_mean * CUS_CONT_CM_SM_corr | Product of summary statistics as described in Tables 1, 2 and 3 extracted from the CIS_CR content masking map, CUS_CONT content masking map and the salience map. | −0.130 | 32 |
| CUS_CONT_CM_entropy * MS_L_WCM_sal_sumratio | Product of summary statistics as described in Tables 1, 2 and 3 extracted from the CUS_CONT content masking map, MS_L content masking map and the salience map. | −0.0117 | 33 |
| CIS_CR_CM_SM_corr * CUS_NS_CM_SM _corr | Product of summary statistics as described in Tables 1, 2 and 3 extracted from the CIS_CR content masking map, CUS_NS content masking map and the salience map. | −0.110 | 34 |
| CUS_LUM_CM_SM_corr * MS_L_CM_SM_corr | Product of summary statistics as described in Tables 1, 2 and 3 extracted from the CUS_LUM content masking map, MS_L content masking map and the salience map. | −0.141 | 35 |
| CUS_CONT_CM_entropy * MS_L_WCM_sal_meanratio | Product of summary statistics as described in Tables 1, 2 and 3 extracted from the CUS_CONT content masking map, MS_L content masking map and the salience map. | −0.000455 | 36 |
| CUS_LUM_WCM_sal_sumratio * CUS_NS_WCM_sal_meanratio | Product of summary statistics as described in Tables 1, 2 and 3 extracted from the CUS_LUM content masking map, CUS_NS content masking map and the salience map. | −0.000214 | 37 |
| CIS_CR_CM_SM_corr * CUS_LUM_CMmap_mean | Product of summary statistics as described in Tables 1, 2 and 3 extracted from the CIS_CR content masking map, CUS_LUM content masking map and the salience map. | −0.00520 | 38 |

The method 200 then proceeds under execution of the processor 1505 from step 201 to a selecting step 202. Execution of the selecting step 202 operates to select a highest appropriate ranked high-level feature from the list of high-level feature 210 for further processing. In terms of the MFAM arrangements described an "appropriate" high-level feature is a high-level feature that contains information from a content masking map sensitive to the first aspect to be modified in the target image 110 (contrast in the example of FIG. 12), information from a content masking map sensitive to the second aspect to be modified in the target image 110 (luminance in the example of FIG. 12) and information from a salience map. In the specific example of FIG. 12, content masking maps, CUS_CONT, MS_C and MS_S would be sensitive to contrast adjustments, while CUS_LUM and MS_L would be sensitive to luminance adjustments. Appropriate high-level features from the list of high-level features would include high-level features listed in Table 5 below.

TABLE 5

List of high-level features appropriate for adjusting luminance and contrast.

| High-Level Feature Description | High-Level Feature Detailed Description | Coefficient | Ranking |
|---|---|---|---|
| CUS_CONT_CM_SM_corr * CUS_LUM_CM_SM_corr | Product of summary statistics as described in Tables 1, 2 and 3 extracted from the CUS_CONT content masking map, CUS_LUM content masking map and the salience map. | 1.78 | 4 |
| CUS_CONT_CM_SM_corr * MS_L_WCMmap_mean | Product of summary statistics as described in Tables 1, 2 and 3 extracted from the CUS_CONT content masking map, MS_L content masking map and the salience map. | 22.9 | 6 |
| CUS_LUM_WCMmap_mean * MS_S_WCM_sal_sumratio | Product of summary statistics as described in Tables 1, 2 and 3 extracted from the CUS_LUM content masking map, MS_S content masking map and the salience map. | 6.44 | 8 |
| CUS_LUM_CM_entropy * MS_C_WCMmap_mean | Product of summary statistics as described in Tables 1, 2 and 3 extracted from the CUS_LUM content masking map, MS_C content masking map and the salience map. | 0.594 | 9 |
| CUS_CONT_CM_SM_corr * MS_L_CMmap_mean | Product of summary statistics as described in Tables 1, 2 and 3 extracted from the CUS_CONT content masking map, MS_L content masking map and the salience map. | 16.4 | 12 |
| CUS_LUM_CM_SM_corr * MS_C_CMmap_mean | Product of summary statistics as described in Tables 1, 2 and 3 extracted from the CUS_LUM content masking map, MS_C content masking map and the salience map. | 11.5 | 13 |
| MS_C_CM_SM_corr * MS_L_WCMmap_mean | Product of summary statistics as described in Tables 1, 2 and 3 extracted from the MS_C content masking map, MS_L content masking map and the salience map. | 22.3 | 14 |

TABLE 5-continued

List of high-level features appropriate for adjusting luminance and contrast.

| High-Level Feature Description | High-Level Feature Detailed Description | Coefficient | Ranking |
|---|---|---|---|
| CUS_LUM_CM_entropy * MS_C_WCM_sal_meanratio | Product of summary statistics as described in Tables 1, 2 and 3 extracted from the CUS_LUM content masking map, MS_C content masking map and the salience map. | 0.0375 | 16 |
| MS_L_WCM_sal_sumratio * MS_S_CM_entropy | Product of summary statistics as described in Tables 1, 2 and 3 extracted from the MS_L content masking map, MS_S content masking map and the salience map. | −0.0401 | 25 |
| CUS_CONT_WCM_sal_sumratio * CUS_LUM_CM_SM_corr | Product of summary statistics as described in Tables 1, 2 and 3 extracted from the CUS_CONT content masking map, CUS_LUM content masking map and the salience map. | 0.202 | 28 |
| CUS_CONT_CM_entropy * MS_L_WCM_sal_sumratio | Product of summary statistics as described in Tables 1, 2 and 3 extracted from the CUS_CONT content masking map, MS_L content masking map and the salience map. | −0.0117 | 33 |
| CUS_CONT_CM_entropy * MS_L_WCM_sal_meanratio | Product of summary statistics as described in Tables 1, 2 and 3 extracted from the CUS_CONT content masking map, MS_L content masking map and the salience map. | −0.000455 | 36 |

The highest ranking appropriate high-level feature from TABLE 5 is CUS_CONT_CM_SM_corr*CUS_LUM_CM_SM_corr—hence this high-level feature is selected in execution of the selecting step 202.

The method 200 then proceeds under execution of the processor 1505 from the selecting step 202 to a determining step 203. In execution of the determining step 203, the highest ranking high-level feature is used to determine the adjustment map 140. The adjustment map 140 comprises positive values in regions of the target image 110 where the MFAM system suggests that the luminance be increased and negative values in regions of the target image 110 where the MFAM system suggests that the luminance be decreased. In generating the adjustment map 140, the application 1533 effectively operates to determine a region of the contrast adjusted image 150. The magnitude of the values in the adjustment map 140 indicate the degree of luminance change suggested for each pixel in the contrast adjusted image 150. Larger magnitude values in the adjustment map 140 indicate stronger adjustments to luminance are suggested for the contrast adjusted image 150. The adjustment map 140 does not indicate the absolute luminance adjustment applied to each pixel, rather the relative differences in suggested luminance adjustments between pixels in the contrast adjusted image 150. The adjustment map 140 is be multiplied by a global luminance adjustment value by the user adjusting the luminance adjustment slider 1208 to determine a final luminance adjustment for the contrast adjusted image 150. A method 300 of determining an adjustment map, as implemented at the determining step 203, is described in more detail below with reference to FIG. 3.

The method 200 then proceeds under execution of the processor 1505 from the determining step 203 to a determining step 204. In execution of the determining step 204, a test global luminance adjustment is determined. The test global luminance adjustment is computed to predict the preference for the transformed image 120 in the event that the user selects a value of the global luminance adjustment equal to the test global luminance adjustment. In the MFAM arrangements described, step 204 starts with a minimum possible luminance adjustment (−Lmax, Lmax being a maximum luminance of the contrast adjusted image 150 in CIE Lab space for example). The application 1533 increments the test global luminance adjustment by +1 each time step 204 is invoked in the method 200. A test global luminance change of value 0 (zero) is typically also determined at step 204, by which a preference for the contrast-adjusted image 150 is defined by operation of a step 206.

The method 200 then proceeds under execution of the processor 1505 from the determining step 204 to an adjusting step 205. In execution of the adjusting step 205, the application 1533 applies an adjustment process associated with each pixel in the adjustment map 140 as determined by the step 105, on a pixel-by-pixel basis to the contrast adjusted image 150 to create the temporary transformed image 240.

In the MFAM arrangements described, the modification applied to the contrast adjusted image 150 by execution of the step 205 in order to create the temporary transformed image 240 is a luminance modification. The adjustment map 140 specifies the sign and relative scaling of luminance adjustments to be applied to the contrast adjusted image 150. The test global luminance adjustment determined during step 204 provides the absolute scaling of the luminance adjustment to be provided to the contrast adjusted image 150 by the step 205 in order to create the temporary transformed image 240. For example, if the test global luminance adjustment is 1.3, a value of 1.3 is multiplied with every pixel of the adjustment map 140 to obtain the adjustment process applied to each pixel of the contrast adjusted image 150 by the step 205 in order to create the temporary transformed image 240. In such an instance, execution of the step 205 applies the adjustment process to the contrast adjusted image 150 to form the temporary transformed image 240 by converting the contrast adjusted image 150, which is in sRGB colour space, to CIELCh space and adding to the L component value of each pixel the value of the corresponding pixel in the adjustment map 140 multiplied by the test global luminance adjustment computed in step 204. The temporary transformed image 240 is then converted back into the sRGB colour space.

The method 200 then proceeds under execution of the processor 1505 from the adjusting step 205 to a determining step 206. A method 400 of determining a preference distribution, as implemented at step 206 is described hereinafter in more detail with reference to FIG. 4. The determining step 206 executes to determine an observer preference distribution using the MDOF metric. The determining step 206 outputs an observer preference value distribution 230 (also referred to as a preference value distribution or a preference distribution) as depicted, for example, in FIG. 10A. The observer preference distribution 230 comprises information describing a prediction of the distribution of observer preference scores for the contrast adjusted image 150 with respect to the temporary transformed image 240. The observer preference distribution 230 represents an expected or estimated preference of the user for the temporary transformed image 240 in a range of possible temporary transformed images. The observer preference score can range from a strong preference for the contrast adjusted image 150 to a strong preference for the temporary transformed image 240. The observer preference score can also assume intermediate levels of preference such as "don't care". The preference distribution scores 230 can be represented by a discrete number of preference measure bins such as depicted by the diagram 1000 of FIG. 10A.

Figure 10B:
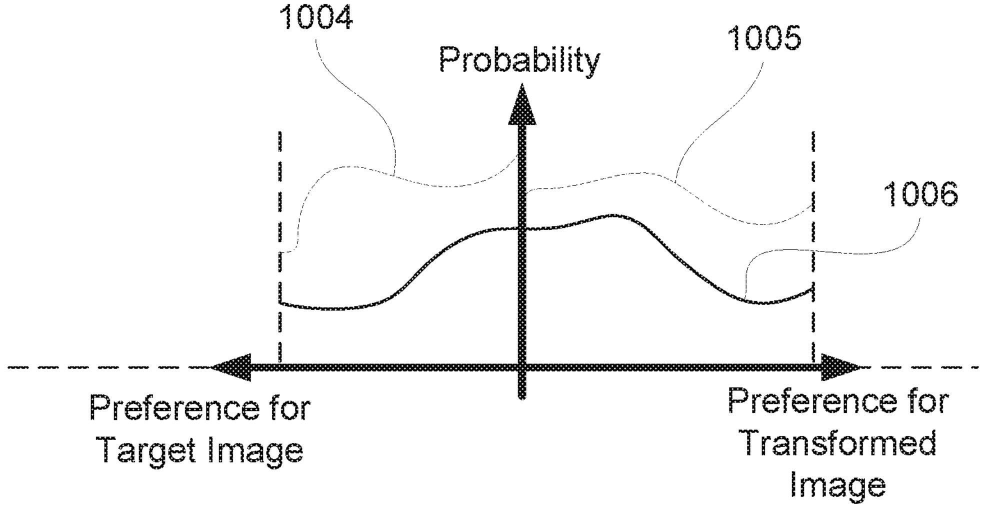

Alternatively, the preference distribution scores 230 can be represented by one or more mathematical functions 1004, 1005, 1006 (or the coefficients of one or more mathematical functions) as shown in FIG. 10B. The functions 1004, 1005 and 1006 represent a continuous 1006 or piecewise continuous 1004, 1005 distribution of preference scores as depicted in FIG. 10B.

The method 200 then proceeds under execution of the processor 1505 from the determining step 206 to a storing step 207. In execution of the storing step 207 the expected user preference for the temporary transformed image 240 determined by the MDOF system in step 206 and stored in the observer preference value distribution 230 is recorded or stored in the preference record 130. The preference for the transformed image 240 is recorded in the preference record 130 together with the test global luminance adjustment determined at step 204.

The method 200 then proceeds under execution of the processor 1505 from the storing step 207 to a check step 208. In execution of the check step 208, the test global luminance adjustment is checked to determine whether the test global luminance adjustment has reached a corresponding maximum value. In the MFAM arrangements described, the maximum value of the test global luminance adjustment is Lmin+100 where Lmin is the minimum luminance of the contrast adjusted image 150 in CIE Lab space. If the test global luminance adjustment has not reached the corresponding maximum value ("No" at step 208), the method 200 proceeds from step 208 to step 204. Step 204 executes to increment the test global luminance adjustment. Step 204 to 208 effectively operate to apply a plurality of luminance adjustments to the contrast adjusted image, and determine a preference for each of the plurality of luminance adjustments applied to the contrast-adjusted image.

If step 208 returns a "Yes", the method 200 ends.

A Method for Determining an Adjustment Map

Figure 3:
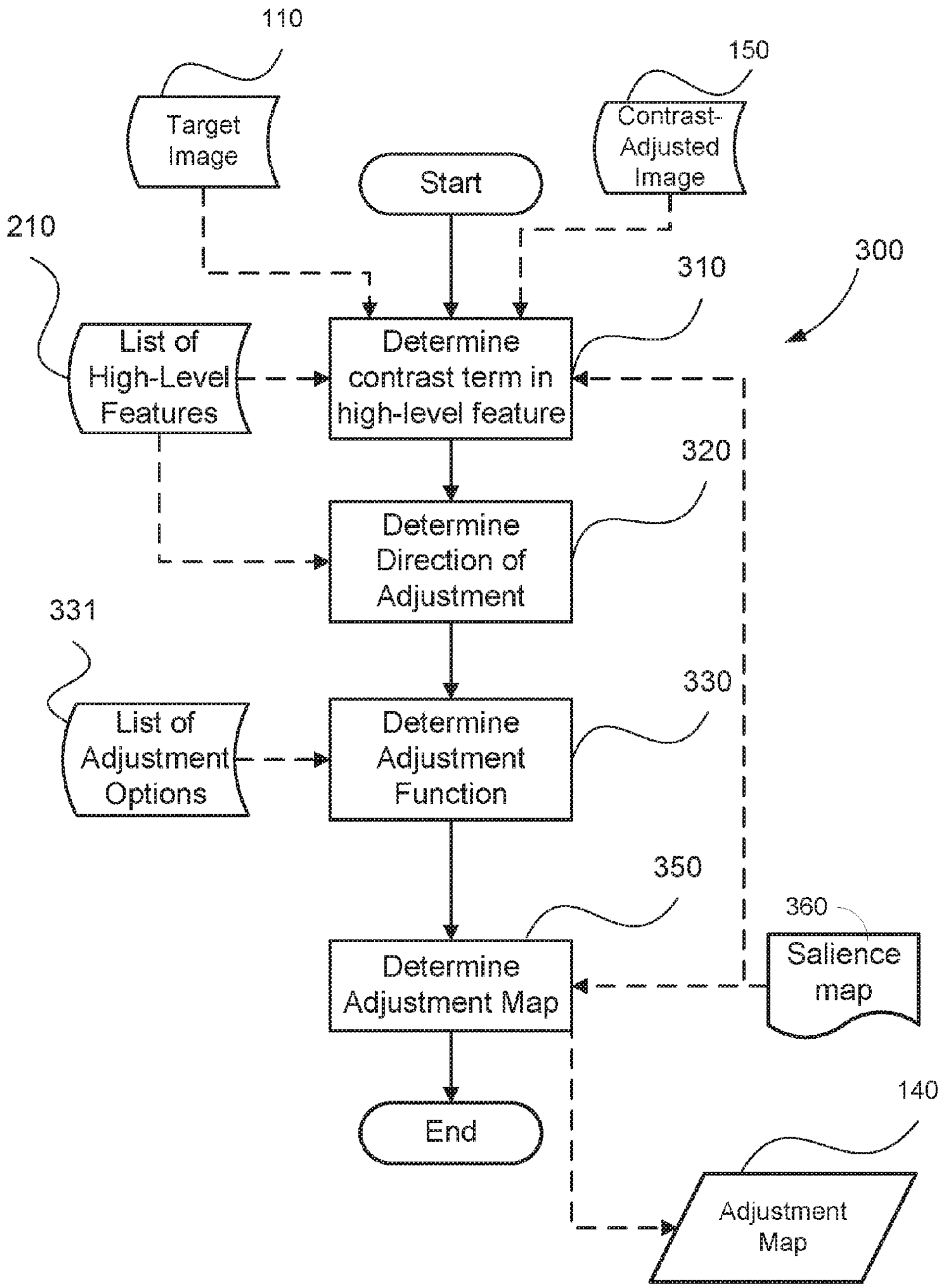
FIG. 3 is a schematic flow diagram illustrating a method of determining an adjustment map according to one MFAM arrangement.

FIG. 3 is a schematic flow diagram illustrating the method 300 of determining an adjustment map according to one MFAM arrangement. In particular, FIG. 3 shows a method 300 for determining an adjustment map that can be implemented by the determining step 203 of the method 200. The method 300 is typically implemented as one or more modules of the application 1533 stored in the memory 1506 and controlled by execution of the processor 1505.

The method 300 starts at a determining step 310. In execution of the determining step 310, a contribution of the first aspect to the highest-ranking high-level feature is determined using the target image 110, the contrast adjusted image 150 and the salience map 360. In the described MFAM arrangements the first aspect is contrast and the second aspect is luminance. However, as discussed above, other aspects may be chosen such as sharpness, luminance, chroma or noise level.

In executing the determining step 310, the application 1533 uses the statistics shown in Tables 1, 2 and 3 above to compute the value of the term in the highest ranking high-level feature that depends on the first aspect (contrast). In order to compute the value of the term, the step 310 may compute content masking maps between the target image 110 and the contrast adjusted image 250 and a salience map 360 from the target image 110. Methods 600 and 700 for computing content masking maps, each implementable at step 310, will be described below with reference to FIGS. 6 and 7. A method 500 for computing a salience map will be described below with reference to FIG. 5.

By way of an example, in the described MFAM arrangements the highest ranking high-level feature selected by step 202 of method 200 was:

CUS_CONT_CM_SM_corr*CUS_LUM_CM_SM_corr

The first term in the selected high-level feature is "CUS_CONT_CM_SM_corr" which is the correlation between the "CUS_CONT" content masking map computed from the target image 110 and the contrast adjusted image 150 and the salience map 360 computed from the target image 110. The determining step 310 computes the CUS_CONT content masking map using step 650 of the method 600 shown in FIG. 6 and computes the salience map 360 using the method 500 shown in FIG. 5. A two-dimensional correlation is performed between the CUS_CONT content masking map and salience map 360 to compute value of the contrast term (the CUS_CONT_CM_SM_corr term in the example shown) in the highest ranked high-level feature. The contrast term is then stored by step 310 for future reference, for example in the memory 1506.

The method 300 then proceeds under execution of the processor 1505 from the determining step 310 to a determining step 320. In execution of the determining step 320, a direction of adjustment for the second aspect term ("luminance term" in the described MFAM arrangements) is determined. The determining step 320 examines contribution of the second aspect to the highest ranking high-level feature selected by the selecting step 202 in the method 200, the value of the contrast term (as determined by the determining step 310), and the value of the coefficient of the highest ranking high-level feature as stored in the list of high-level features 210. The direction of adjustment is determined such that the contribution of the highest ranking high-level feature to the preference for the transformed image 120 is maximised. The determining step 320 first considers the direction of adjustment in the case that the coefficient of the highest ranked high-level feature in the cost function is positive. The following table, Table 6, enumerates the possibilities.

TABLE 6

Table of Directions of Adjustment

| Type of High-level Feature | Example (Definition of high-level features given in Table 4) | Sign of contrast term in High-level Feature | Direction of Adjustment for luminance term |
|---|---|---|---|
| Interaction | CUS_CONT_CM_SM_corr * CUS_LUM_CM_SM_corr | Positive | Increase value of luminance term |
| Interaction | CUS_CONT_CM_SM_corr * CUS_LUM_CM_SM_corr | Negative | Decrease value of luminance term |

The above Table 6 is designed such that the direction of adjustment of the luminance term increases the preference for the transformed image 120. High-level features with positive signs are increased and high-level features with negative signs are decreased. The highest ranking high-level feature selected by step 202 in the method 200 is used in steps 460 to 470 of the method 400 in FIG. 4 to compute the log ratio of the preference for the transformed image 120 over the preference for the target image 110. If the highest ranked high-level feature has a positive coefficient in the log ratio of the preference for the transformed image 120 over the preference for the target image 110, increasing the value of the highest-ranked high-level feature will increase the preference for the transformed image 120 over the preference for the target image 110. If the MDOF system contains higher order interactions or higher-order functions of the luminance term in the highest ranking high-level feature, similar rules for the direction to adjust the luminance term in order to increase the value of the highest ranking high-level feature can be determined.

After using the above Table No. 6 to find the direction of adjustment, the determining step 320 checks the sign of the coefficient of the highest ranked high-level feature as stored in the list of high-level features 210. If the sign of the coefficient is negative then the direction of adjustment is inverted (Increase Statistic→Decrease Statistic and Decrease Statistic→Increase Statistic).

The method 300 then proceeds under execution of the processor 1505 from the determining step 320 to a determining step 330. In execution of the determining step 330 the adjustment function is determined. Each of the summary statistics shown in Tables 1 and 2 above has a set of functions that can be used adjust the value of the statistic up or down. As described above, only summary statistics that describe aspects of the content masking maps 260 are suitable as the luminance term for the MFAM system. The following Table 7 gives examples of summary statistics and appropriate example adjustment functions that can be selected by the determining step 330.

TABLE 7

Table of Adjustment Functions

| Summary statistic of luminance term (Definition of summary statistics will be given in Tables 1,2 and 3 above) | Direction of Adjustment determined by step 320 | Adjustment Function |
|---|---|---|
| CMmap_mean | Increase Statistic | Global increase in luminance |
| CM_entropy | Increase Statistic | Increase range of luminance values |
| WCMmap_mean | Increase Statistic | Increase luminance values for each pixel in adjustment map in proportion to corresponding value in salience map 360 |
| WCM_sal_meanratio | Increase Statistic | Increase luminance values for each pixel in adjustment map where the Corresponding Value in Salience Map 360 is greater than 0.5. Decrease luminance values for each pixel in adjustment map where the |

TABLE 7-continued

| Table of Adjustment Functions | | |
|---|---|---|
| Summary statistic of luminance term (Definition of summary statistics will be given in Tables 1,2 and 3 above) | Direction of Adjustment determined by step 320 | Adjustment Function |
| | | Corresponding Value in Salience Map 360 is less than 0.5. |
| CM_SM_corr | Increase Statistic | Increase luminance values for each pixel in adjustment map in proportion to corresponding value in salience map 360 |
| WCM_sal_sumratio | Increase Statistic | Increase luminance values for each pixel in adjustment map where the Corresponding Value in Salience Map 360 is greater than 0.5. Decrease luminance values for each pixel in adjustment map where the Corresponding Value in Salience Map 360 is less than 0.5. |
| CMmap_mean | Decrease Statistic | Global decrease in luminance |
| CM_entropy | Decrease Statistic | Decrease range of luminance values |
| WCMmap_mean | Decrease Statistic | Decrease luminance values for each pixel in adjustment map in proportion to corresponding value in salience map 360 |
| WCM_sal_meanratio | Decrease Statistic | Decrease luminance values for each pixel in adjustment map where the Corresponding Value in Salience Map 360 is greater than 0.5. Increase luminance values for each pixel in adjustment map where the Corresponding Value in Salience Map 360 is less than 0.5. |
| CM_SM_corr | Decrease Statistic | If the content masking map is MS_L, MS_C or MS_S then make no change, otherwise, decrease luminance values for each pixel in adjustment map in proportion to corresponding value in salience map 360 |
| WCM_sal_sumratio | Decrease Statistic | Decrease luminance values for each pixel in adjustment map where the Corresponding Value in Salience Map 360 is greater than 0.5. Increase luminance values for each pixel in adjustment map where the Corresponding Value in Salience Map 360 is less than 0.5. |

The above Table 7 is stored in a pre-computed List of Adjustment Options 331. The List of Adjustment Options 331 may be stored, for example, on the memory 1506 The determining step 330 determines an adjustment function by matching the luminance term summary statistic to be adjusted with the left column of the List of Adjustment Options 331 and the direction of adjustment is determined by the step 320 with the middle column of the List of Adjustment Options 331. The adjustment function can then be read from the corresponding entry in the right hand column of the List of Adjustment Options 331.

The method 300 then proceeds under execution of the processor 1505 from determining step 330 to a determining step 350. In execution of the determining step 350, the adjustment map 140 is determined. The adjustment map 140 is of equal size to the target image 110 and contrast adjusted image 150. Every pixel in the adjustment map 140 reflects an adjustment to be applied to the corresponding pixel of the contrast adjusted image 150 to obtain either the transformed image 120 or the temporary transformed image 240. In generating the adjustment map 140 at step 350, the method 300 effectively operates to determine a region of the contrast-adjusted image 150 based on the saliency map 360 and the preference for the contrast adjusted image defined by the received contrast adjustment.

The adjustment map 140 depends on the adjustment function chosen by the determining step 330. In one MFAM arrangement the form of the adjustment map 140 is given in the following Table 8:

TABLE 8

Table of Adjustment Maps

| Adjustment Function chosen by step 330 | Adjustment Map |
|---|---|
| Global increase in luminance | All pixels in Adjustment Map set to α, where α is global factor (α = 1.0, in the described MFAM arrangement) |
| Increase range of luminance values | Pixel (i, j) in Adjustment Map set to α(L(i, j) − ML)/ML, where L(i, j) is the luminance of pixel (i, j) in the contrast adjusted image 150 and ML is the mean luminance of the transformed image 120. The parameter α is a scaling factor (α = 1.0, in the described OPDM arrangement) |
| Increase luminance values for each pixel in adjustment map in proportion to corresponding value in salience map 360 | Pixel (i, j) in Adjustment Map set to α(S(i, j)), where S(i, j) is the value of the pixel at position (i, j) in the salience map 360. The parameter α is a scaling factor (α = 1.0, in the described MFAM arrangement) |
| Increase luminance values for each pixel in adjustment map where the Corresponding Value in Salience Map 360 is greater than 0.5. Decrease luminance values for each pixel in adjustment map where the Corresponding Value in Salience Map 360 is less than 0.5. | Pixel (i, j) in Adjustment Map set to 2α(S(i, j) − 0.5), where S(i, j) is the value of the pixel at position (i, j) in the salience map 360. The parameter α is a scaling factor (α = 1.0, in the described MFAM arrangement) |
| Global decrease in luminance | All pixels in Adjustment Map set to α, where α is global factor (α = 1.0, in the described MFAM arrangement) |
| Decrease Range of Values in Content Masking Map 260 | Pixel (i, j) in Adjustment Map set to α(ML − L(i, j))/ML, where L(i, j) is the luminance of pixel (i, j) in the contrast adjusted image 150 and ML is the mean luminance of the transformed image 120. The parameter α is a scaling factor (α = 1.0, in the described MFAM arrangement) |
| Decrease luminance values for each pixel in adjustment map in proportion to corresponding value in salience map 360 | Pixel (i, j) in Adjustment Map set to α(S(i, j)), where S(i, j) is the value of the pixel at position (i, j) in the salience map 360. The parameter α is a scaling factor (α = 1.0, in the described MFAM arrangement) |
| Decrease luminance values for each pixel in adjustment map where the Corresponding Value in Salience Map 360 is greater than 0.5. Increase luminance values for each pixel in adjustment map where the Corresponding Value in Salience Map 360 is less than 0.5. | Pixel (i, j) in Adjustment Map set to 2α(S(i, j) − 0.5), where S(i, j) is the value of the pixel at position (i, j) in the salience map 360. The parameter α is a scaling factor (α = 1.0, in the described MFAM arrangement) |

Table 8 shows adjustment processes for the described MFAM arrangements. However, other processes may be used, particularly if other second aspects are being used for the MFAM system. For example, if the second aspect is chroma, a more appropriate implementation may be that the adjustment map be multiplied with the chroma component of the contrast adjusted image, rather than added. Such an implementation would change the adjustment processes in Table 8. In addition, chroma adjustments suggested to the user must always be positive (chroma adjustments are multiplicative and so are only defined for positive values to result in positive chroma values in transformed image 120). Such also would change the nature of the adjustment processes in Table 8.

The output of the determining step 350 is the Adjustment Map 140.

Following execution of the determining step 350, the method 300 ends.

A Method for Computing an Observer Preference Distribution

Figure 4:
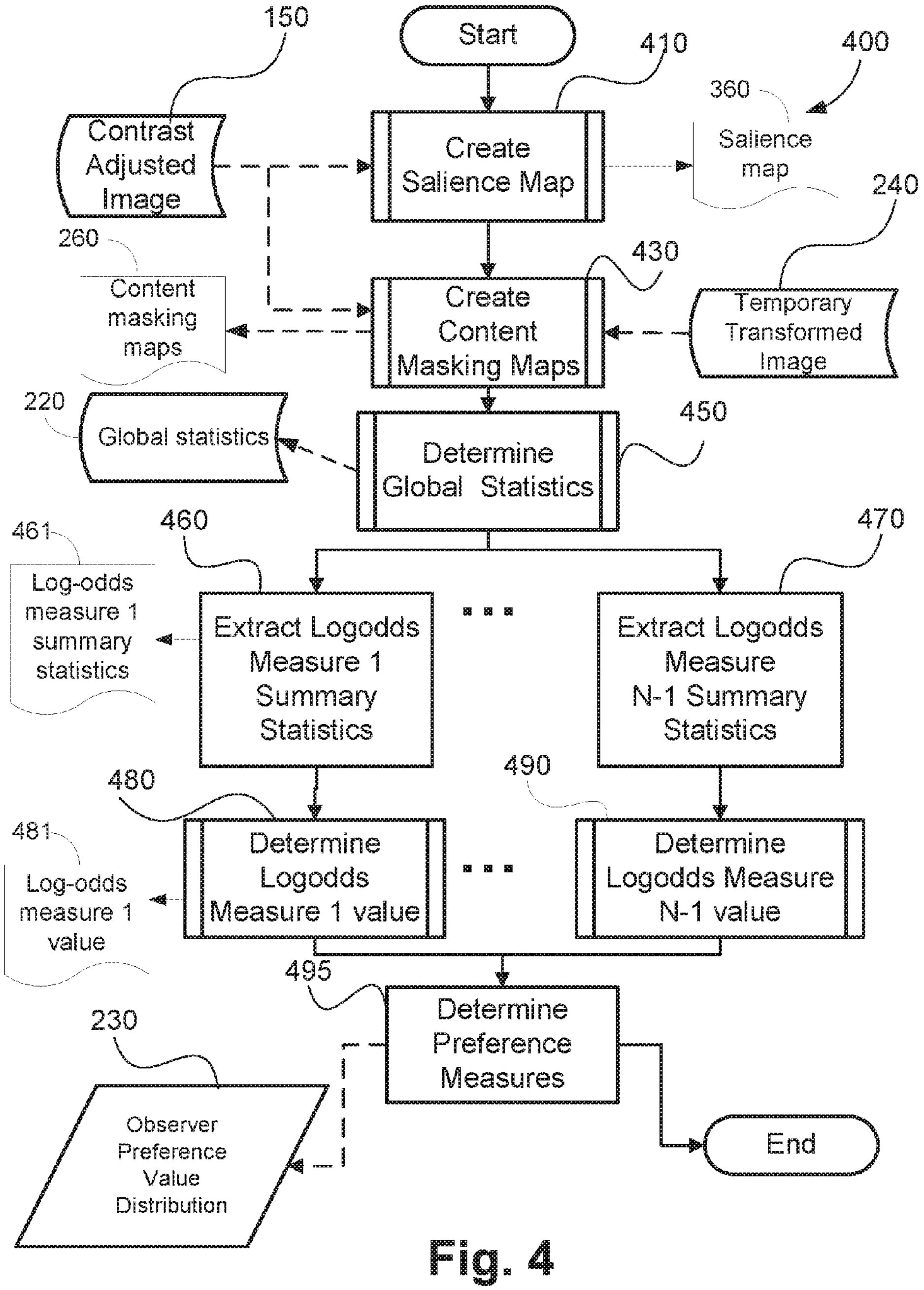
FIG. 4 is a schematic flow diagram illustrating a method of determining an observer preference distribution according to one MFAM arrangement.

FIG. 4 is a schematic flow diagram illustrating the method 400 of determining an observer preference value distribution. For example, the method 400 may determine the observer preference value distribution 230 according to one MFAM arrangement. In particular, FIG. 4 shows the method 400 for determining an observer preference value distribution that can be used by the step 206 of the method 200. The method 400 is typically implemented as one or more modules of the application 1533 stored in the memory 1506 and controlled by execution of the processor 1505.

The method 400 starts at a creation step 410. Execution of the creation step 410 creates the salience map 360 from the contrast adjusted image 150. The salience map 360 indicates which portions of the contrast adjusted image 150 would be viewed most often or would be of most interest to an observer.

Figure 5:
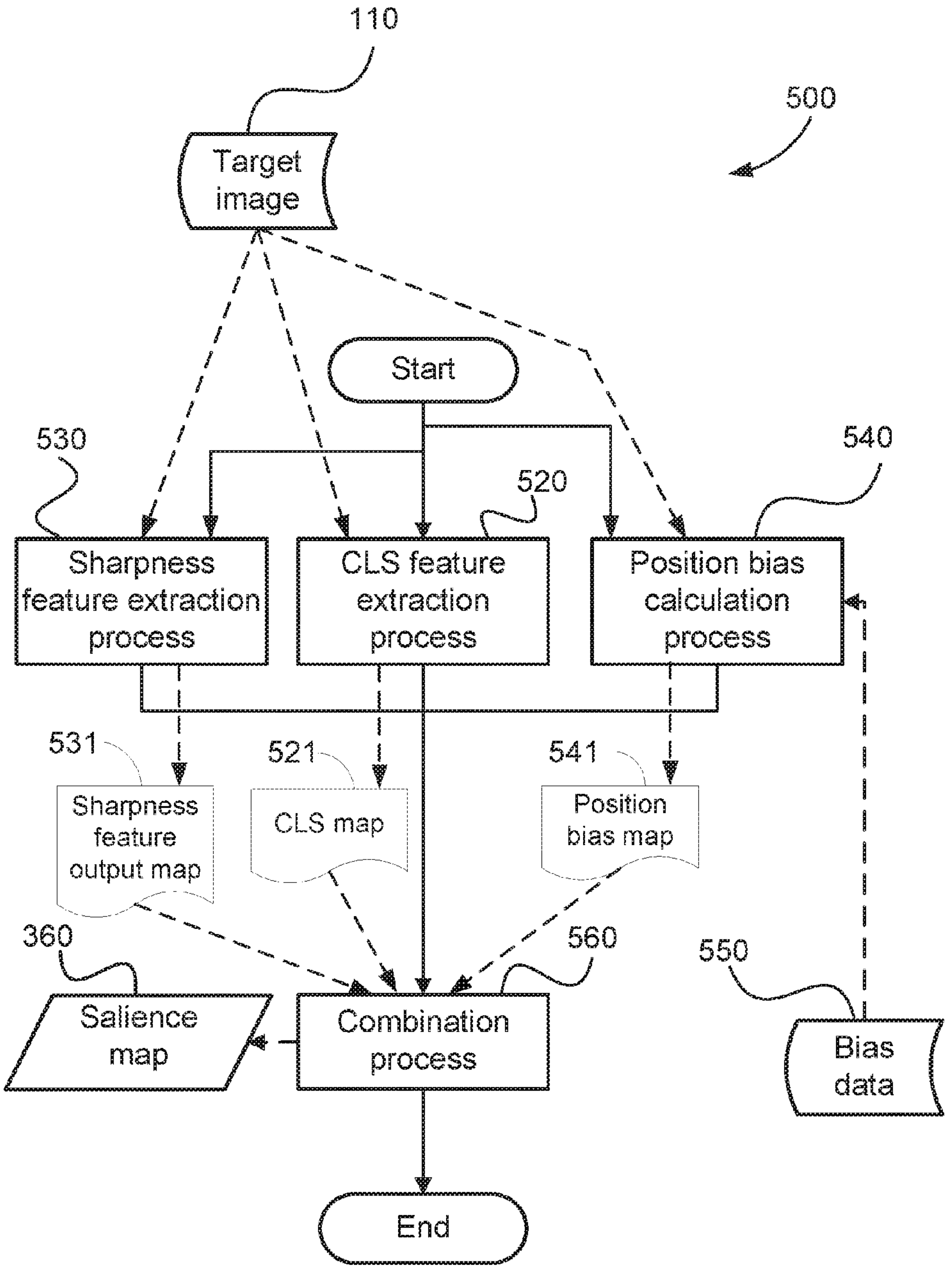
FIG. 5 is a schematic flow diagram of a method of determining a salience map.

In the MFAM arrangements described, the salience map 360 is scaled so that the minimum is zero and the maximum is unity. The creation step 410, described hereinafter in more detail with reference to the method 500 of FIG. 5, depicts examples of salience maps and a method to create a salience map, creates the salience map 360 for the contrast adjusted image 150. However, variations on the step 410 may be more appropriate in other MFAM arrangements, including creating the salience map 360 for the temporary transformed image 240 in addition to (or instead of) the salience map 360 created for the contrast adjusted image 150. In yet further arrangements, salience maps may be generated for each of the contrast adjusted image 150 and the temporary transformed image 240, and the two salience maps used to create an average or interpolated salience map The method 400 then proceeds under execution of the processor 1505 from the creation step 410 to a creation step 430 which creates the content masking maps 260 (described hereinafter in more detail with reference to FIGS. 6 and 7). The content masking maps 260 (providing one example of what is referred to as “a visible difference map”) indicate regions of the contrast adjusted image 150 and temporary transformed image 240 where the differences between the contrast adjusted and temporary transformed images would be visible to an observer.

The method 400 then proceeds under execution of the processor 1505 from the creating step 430 to a determining step 450. Execution of the determining step 450 extracts a set 220 of global summary statistics from the content masking maps 260 and the salience map 360. The global summary statistics 220 are shown in Tables 1, 2 and 3 above and summarise information about the content masking maps 260 and the salience map 360 that is required to determine observer preference measure values. The observer preference measure values are used to make up the observer preference measure value distribution 230 in subsequent steps in the process 400.

In some arrangements, the global summary statistics 220 determined in the step 450 include the mean values of the salience map 360 and the content masking maps 260, measures of variation and structure within the salience map 360 and the content masking maps 260, correlation between the salience map 360 and the content masking maps 260, mutual information between the salience map 360 and the content masking maps 260, or other appropriate statistics. The global summary statistics 220 may in some arrangements include other information such as information about the target image 110, information about the transformed image 120, information about the user, or other appropriate information. Methods to implement the determining step 450 and further examples of summary statistics are described hereinafter in more detail below in regard to FIG. 8.

The method 400 then proceeds under execution of the processor 1505 from the determining step 450 to extraction steps 460 to 470. The extraction steps 460 to 470 execute to extract summary statistics such as 461 that are relevant to each of the log-odds formulae to be used to form the observer preference measure value distribution 230. Thus, for example, the step 460 produces the log-odds measure 1 summary statistics 461. In the case of an observer preference measure value distribution 230 that is represented as an N bin histogram, there are N−1 individual preference measures whose values need to be determined, representing the N−1 degrees of freedom of the histogram. The values in each bin of the observer preference measure value distribution are constrained to sum to unity (if the histogram bins represent the probabilities of an observer holding a particular preference opinion) or one hundred (if the histogram bins represent the percentage of observers holding a particular preference opinion). Because of this constraint, the Nth preference measure value may be determined from the remaining N−1 preference measure values. Hence the observer preference value distribution has only N−1 degrees of freedom and may be represented by N−1 log-odds formulae.

FIG. 4 shows only two steps to extract the summary statistics, that is the extraction steps 460 and 470. However the extraction steps are intended to represent N−1 steps to extract summary statistics relevant to each of the log-odds formulas used to compute the observer preference measure value distribution 230. In the steps 460 to 470 the global list 220 of summary statistics created in the determining step 450 is examined and the summary statistics relevant to each preference measure are extracted. Extracting the summary relevant statistics can be implemented by having a list of the summary statistics relevant to each log-odds formula used to compute the observer preference measure value distribution 230. The extraction steps 460 to 470 are typically performed in parallel, but may be performed sequentially in some implementations.

The method 400 then proceeds under execution of the processor 1505 to determine the log-odds measure values such as the log-odds measure values 481 for forming the observer preference measure value distribution 230. Determination the log-odds measure values is performed by determining steps 480 to 490. FIG. 4 shows only two determining steps 480 to 490 to determine log-odds measure values. However, the steps 480 and 490 are intended to represent N−1 steps to compute each of the N−1 log-odds measure values. The determining steps 480 to 490 are typically performed in parallel, but in some implementations may be performed in series. Methods to implement the steps 480 to 490 are described hereinafter in more detail below, with reference to FIG. 9.

The results of execution of the steps 480 to 490 are N−1 log-odds measure values, such as a value 481 of the log-odds measure No. 1, for N−1 preference measure bins of the observer preference value distribution 230. In the case that the observer preference value distribution is a continuous value distribution parameterised by a mathematical formula, or a set of piecewise continuous value distributions parameterised by mathematical formulae (as depicted in FIG. 10B), the steps 460 to 495 may be performed by a single step that computes the parameters of the mathematical formula describing the observer preference value distribution 230.

The method 400 then proceeds under execution of the processor 1505 from execution of the determining steps 480 to 490 to a determining step 495. Execution of the determining step 495 determines the observer preference value distribution 230. For the described MFAM arrangements, the observer preference value distribution 230 has 3 discrete bins and is described by two log-odds formulae. In the MFAM arrangements described, step 495 determines the value of the second preference bin 1003 in accordance with Equation (1) below.

$$\text{“No Preference”}=\gamma\exp(LOM2)/(1+\gamma\exp(LOM2)), \quad \text{(Equation 1)}$$

where exp( ) is the exponential operator, γ=0.8 and LOM2 is the value of log-odds measure No. 2.

Step 495 determines the value of the first preference bin 1001 using Equation (2) below.

$$\text{“Preference for contrast adjusted image”}=\exp(LOM1)(1-\text{“No Preference”})/(1+\exp(LOM1)) \quad \text{Equation (2)}$$

where exp( ) is the exponential operator and LOM1 is the value of log-odds measure No. 1 481.

Step 495 determines the value of the third preference bin 1002 using Equation (3) below.

$$\text{“Preference for Transformed”}=1-\text{“No Preference”}-\text{“Preference for contrast adjusted image”}. \quad \text{Equation (3)}$$

The output of execution of the step the 495 is the observer preference value distribution 230. Upon execution of the step 495, the method 400 ends. As described above the preference value distribution, and accordingly a luminance adjustment to be displayed, is effectively based upon at least one of one contrast applied to target image 110 (the contrast adjusted image 150) and saliency associated with the regions to which luminance adjustments are suitable.

Method for Creating a Salience Map

The salience map 360 indicates the regions of an image that will attract an observer's attention. There are, according to one approach, two processes by which the extent to which human attention is attracted to elements in a scene being viewed can be estimated.

The first process is referred to as “bottom-up attention”. Bottom-up attention is the tendency of humans to fixate on regions of an image having bright colours, high luminance, sharp edges or regions with luminance or colour characteristics different from surrounding areas of the image. Bottom-up attention does not require semantic understanding of the content of the image in question.

The second process is referred to as “top-down attention”. Top-down attention is the tendency of humans to fixate on regions in an image that contain content that is semantically important to them. The definition of semantically important content is highly dependent on a task that an observer is performing as the observer observes the scene, however in general semantically important content includes such content as faces, human bodies, and eyes. The presence of a human is an important piece of information in a scene and is likely to attract the interest of an observer. There are known techniques for creating salience maps that recognise the presence of skin, faces and/or human body forms and assign higher salience values (indicating correspondingly greater tendency to attract a person's attention) to regions of images that contain these features. Technology for creating salience maps based on top-down and bottom-up philosophies exist.

Image processing operations that affect salient areas of an image have a stronger effect on the observer preference value distribution 230 compared to image processing operations that affect non-salient areas of an image. This is because observers will more readily notice changes to an image that occur in salient areas because these areas are more closely examined by observers.

Figure 11A:
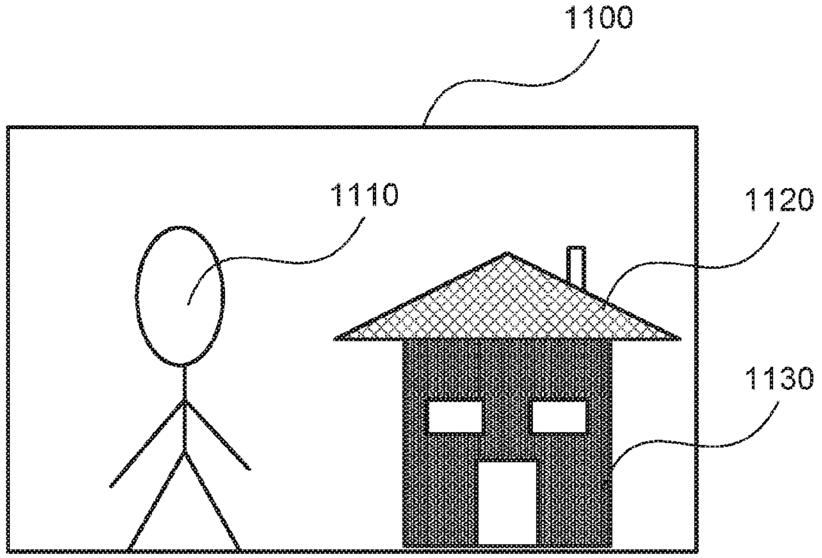
FIGS. 11A and 11B are representations of a salience map obtained from an image according to one MFAM arrangement.
Figure 11B:
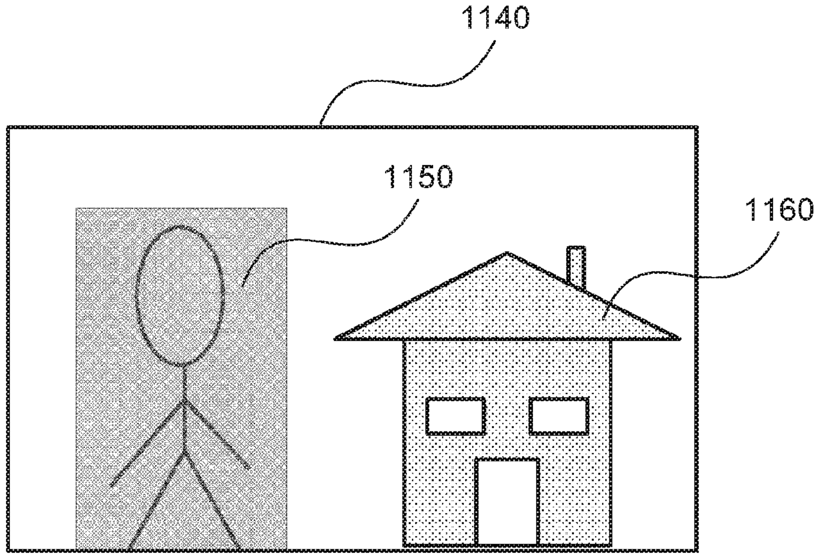

FIGS. 11A and 11B are representations of a salience map that are obtained from an image according to one MFAM arrangement. In particular, FIGS. 11A and 11B illustrate the concept of a bottom-up salience map. An image 1100 in FIG. 11A is referred to as a target image such as the target image 110. The image 1100 contains a number of different types of content including an image 1110 of a person that is sharply in focus, and an image 1130 of a house with bright red walls and a grey roof 1120. The house 1130 is in the background of the image 1100 and is slightly out of focus. A salience map 1140 in shown FIG. 11B is formed for the image 1100. The salience map 1140 indicates that a saliency 1150 of the image of the person 1110, as depicted by dense shading, is higher (greater) than the saliency 1160 of the image of the house 1130, as depicted by lighter shading. The saliency of the person 1150 is higher due to the presence of more in-focus details compared to the house 1160. Sharp details in an image attract more attention from an observer than out-of-focus details. A top-down salience map might also create a similar salience map as that shown as the map 1140, applying more salience to the region of the person 1150 due to the semantic importance of the person 1110 to the scene.

FIG. 5 is a schematic flow diagram illustrating the method 500 of determining a salience map that can be implemented by the creation step 410 in the method 400. The saliency prediction method 500 generates the salience map 360 for the target image 110 by analysing the target image 110 using visual and computational features. The method 500 is typically implemented as one or more modules of the application 1533 stored in the memory 1506 and controlled by execution of the processor 1505.

As described below, in execution of the method 500, the target image 110, preferably in a standard colour encoding such as sRGB, is analysed separately by a Colour Luminance Size (CLS) feature extraction process 520, a sharpness feature extraction process 530, and a position bias calculation process 540 based on bias data 550. The output of the processes 520, 530, and 540 are then combined by a combination process 560 to produce the salience map 360.

When processed by the CLS feature extraction step 520 the target image 110 is processed by a scale decomposition process that decomposes the target image 110 into multiple representations at different scales based on size data. The size data represents the relative frequency of occurrence of fixated image region sizes when viewed by a variety of observers as determined by psychophysical experiment. In a particular MFAM arrangement, the size data can be represented as a percentage, in terms of area, that a region covers compared to the size of the image. In a particular MFAM arrangement, the original size data is sampled using 7 downsampling values described below, that represent 3, 4, 5, 6, and 7 percent of the target image 110 area respectively. The target image 110 is downsampled according to the size data. The downsampling factor used in such MFAM arrangements is K where K=sqrt (100/S) with S being the size in percent and sqrt being the square root operator. The outputs of the scale decomposition process are multiple downsampled images, each of which corresponds to a size resulting from the size data. Each of the multiple downsampled images that are the output of the scale decomposition process are transformed into a decorrelated luminance-chrominance perceptual colour space such as the CIELab colour space. Each transformed image is then separated into a series of elements, S.

In one MFAM arrangement, each image element is a pixel of the transformed image. In addition to the transformed image elements S; nS, the complement of the element S over the transformed image is also determined. For example, the transformed image element S may be a pixel in the transformed image and all the other pixels in the transformed image may be nS. In one MFAM arrangement, for each element S and its complement nS, a brightness distance, a colour C1 distance, and a colour C2 distance are determined. The brightness distance is L(S)−L(nS), with L being the luminance as defined by the CIE Lab colour space; the colour C1 distance is C1(S)−C1(nS), with C1 being the perceptual colour axis defined according to Equation (4) below.

$$C1=2*(\cos(\text{alpha})a-\sin(\text{alpha})b) \quad \text{Equation (4)}$$

where a and b are the red-green and blue-yellow components defined by the CIE Lab colour space, and alpha is 35 degrees. The colour C2 distance is C2(S)−C2(nS), with C2 being the perceptual colour axis as determined according to Equation (5) below.

$$C2=\sin(\text{alpha})a+\cos(\text{alpha})b \quad \text{Equation (5)}$$

where a and b are the red-green and blue-yellow components respectively defined by the CIE Lab, and alpha is 35 degrees. The Equation (5) states that C2 makes a 35 degree angle with the axes given by a and b.

While the distances C1 and C2 are here defined over a specific colour space and distance function in Equation (4) and Equation (5) respectively, this should not be construed as an intrinsic limitation of the method 500. The outputs of distance functions are combined to form a global distance map over each of the downsampled images. For example, the global distance map for each downsampled images can be defined according to Equation (6) below.

$$Gd(S,nS)=\text{sqrt}((L(S)-L(nS))\hat{}2+(C1(S)-C1(nS))\hat{}2+(C2(S)-C2(nS))\hat{}2) \quad \text{Equation (6)}$$

Equation (6) gives the Euclidean distance in the same of L, C1 and C2 as defined above. These multiple distance maps form the input of a scale recomposition process that, depending on size data, weights the multiple distance maps and recombines the multiple distances to form a colour-luminance-size (CLS) map. A colour-luminance-size (CLS) map 521 is the output of the CLS feature extraction step 520.

When processed by the sharpness extraction feature process 530 the target image 110 is first decomposed by a channel decomposition step into M channels 1, . . . , M depending on initial colour encoding of the target image 110. For example, if the target image 110 is a standard Red-Green-Blue encoded image, the number of channels M is equal to three: Red, Green, and Blue. Similarly, if the target image 110 is encoded in a chrominance-luminance colour space such as CIE Lab, the number of channels is also three: L, a, and b. For each channel, a three level wavelet decomposition is performed, for example using a Haar wavelet kernel. Once the decomposition has been performed, all of the wavelet decomposition coefficients apart from the LL layer of the last level are combined across all scales and orientations by coefficient combination. Once the coefficients are combined, the step 530 executes to average values from all the M channels coefficients in the cross-channel combination step. The cross channel averaged map is then convolved with a 2-D Gaussian kernel of mean 0 and sigma of 2 degrees to produce the sharpness feature output map (in one MFAM arrangement, the target image 110 is viewed under a general viewing condition, so the target image 110 is subtended 30 degrees horizontally). A sharpness feature output map 531 is the output of the sharpness extraction feature process 530.

When processed by the position bias calculation process 540 the target image 110 is analysed to determine an initial position measurement of the target image 110. The default initial position of the target image 110 is the centre of the captured image. If metadata or additional information is present, the initial position can be determined, for example, as the focus point as defined by the camera AI servo or the area selected on a touch screen enabled image capture device. Pre-determined bias data 550 is used in the process 540 to provide a weighting of image salience as the point of attention moves away from the initial position. In execution of the process 500, the predetermined bias data is, for example, measured by psychophysical experiment and is modelled as a parameterised 2-D Gaussian function with mean (0.5w, 0.5h) and standard deviation (0.28w, 0.26h) where w and h are the width and the height of the target image 110, respectively. The initial position and the pre-determined bias data 550 define a position bias map 541, a map that shows the relative importance of image parts depending on their position within the target image 110. The position bias map 541 is modelled as a parameterised 2-D Gaussian function centred on the initial position with a standard deviation of (0.28w, 0.26h) where w and h are the width and the height of the target image 110, respectively. The output of the position bias calculation process 540 is a position bias map 541.

The CLS map 521 outputted by the CLS feature extraction process 520, the sharpness feature output map 531 outputted by the sharpness extraction feature process 530 and the position bias map 541 outputted by the position bias calculation process 540 are combined into the final salience map 360 by a combination process 560. In execution of the combination process 560, the CLS map 521 that is the output of the CLS feature extraction process 520 is normalised by dividing the CLS map by a maximal value of the cLS map 521 to have a maximal value is equal to 1 (one). The CLS normalised map is then tested to determine whether a median value of the CLS normalised map is greater than 0.5. If the median value is greater than 0.5, the CLS normalised map is inverted so that the new map value is 1−the normalised CLS map value.

The sharpness map 531 that is the output of the sharpness feature extraction process is normalised by dividing the map 531 by a maximal value of the map 531. Accordingly, maximal values of the map 531 become 1 (one). The normalised sharpness map is then tested to determine whether the median value thereof is greater than 0.5. If the median value is greater than 0.5, the map is inverted so that the new map value is 1−the normalised sharpness map value. The sharpness and CLS maps after normalisation and inversion are then compared to determine combination relative weights in execution of the combination step 560. In one MFAM arrangement, the mean (average) value of the CLS map, mCLS, and the mean (average) value of the sharpness map, mSharp are determined. Weights for the CLS map, wCLS, and the sharpness map, wSharp, are determined as (2*mSharp)/(2*mSharp+mCLS) and (mCLS)/(2*mSharp+mCLS), respectively.

Finally, the position map 541, the sharpness map 531, and the CLS map 521 are combined by execution of the combination function 560. This combination function 560 can be additive, or point multiplicative. In one MDOF arrangement, the combination function is wSharp*(SharpMap.*PosMap)+wSharp*(SharpMap)+wCLS*(MapCLS)+wCLS*(MapCLS.*PosMap) where ".*" is the point by point multiplication operator. The output of the combination function 560 can then be normalised and forms the salience map 360 of the target image 110. The salience map 360 is normalised such that the maximum of the map is unity and the minimum is zero.

The method 500 provides one method of computing a salience map 360 that may be used for implementation of the step 410. However other methods for computing a salience map may be used in performing the step 410. For example, a method that identifies faces in an image could be used in one MDOF arrangement as faces are a salient aspect of images, as discussed above.

Overview of Content Masking Map Calculations

Figure 6:
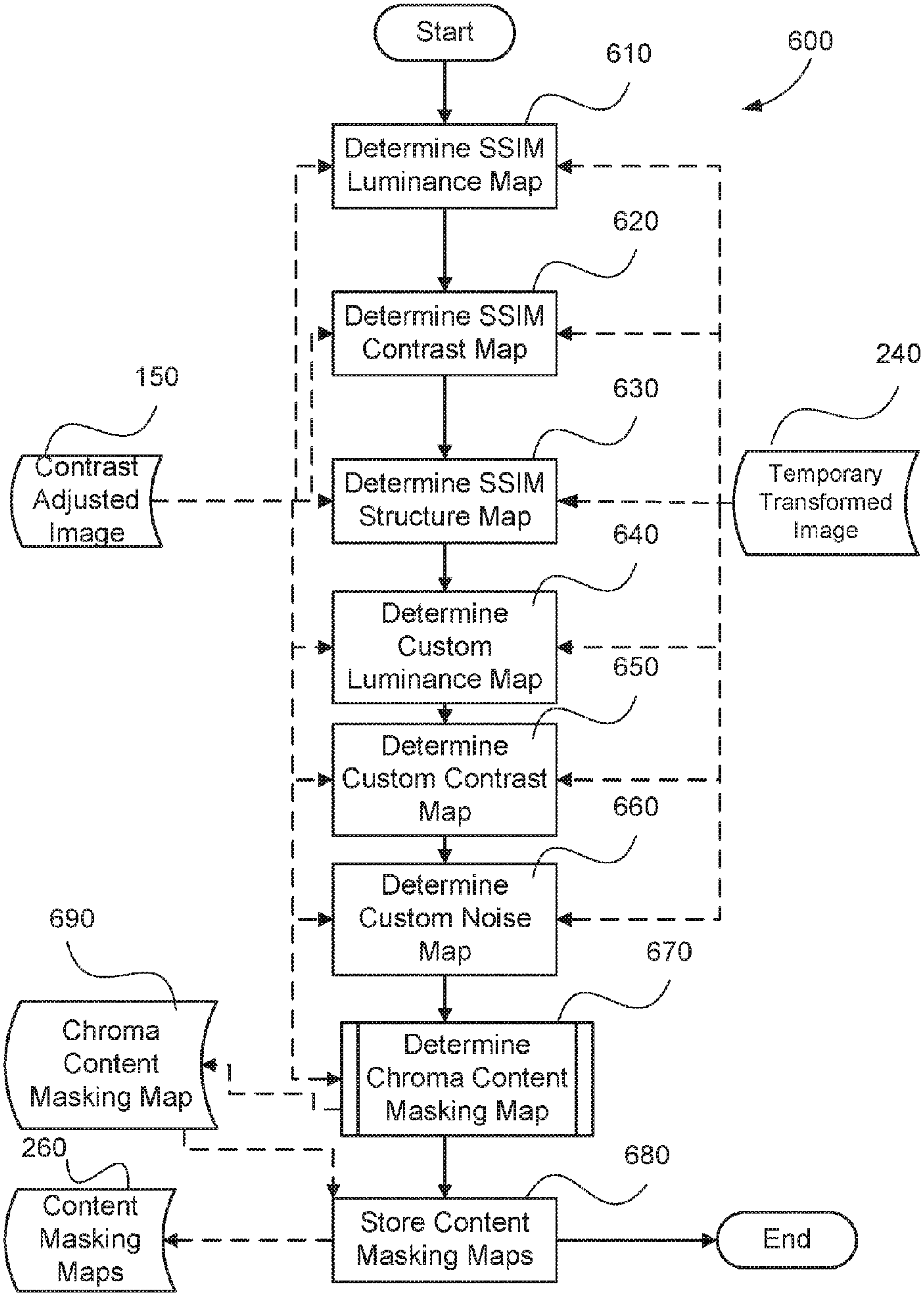
FIG. 6 is a schematic flow diagram of a method of determining a set of content masking maps.

FIG. 6 is a schematic flow diagram illustrating the method 600 for determining a set of content masking maps (a content masking map being one example of a visible difference map) between two images according to one MFAM arrangement.

The method 600 is typically implemented as one or more modules of the application 1533 stored in the memory 1506 and controlled by execution of the processor 1505.

The inputs to the method 600 are two images, namely the contrast adjusted image 150 and the temporary transformed image 240. The outputs of the method 600 are the content masking maps 260 which indicate the perceived differences between the contrast adjusted image 150 and the temporary transformed image 240.

Figure 13:
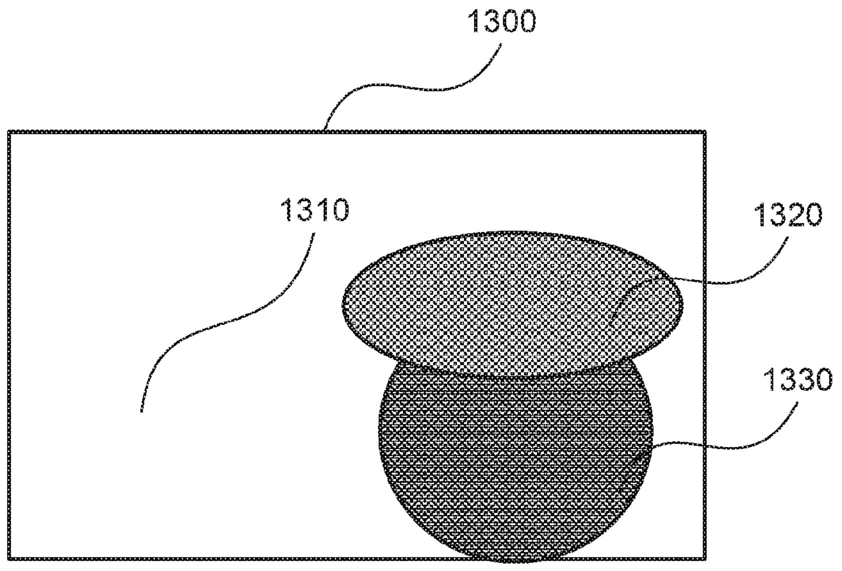
FIG. 13 is a representation of a content masking map obtained from an image according to one MFAM arrangement.

FIG. 13 shows a form of a chroma content masking map (CIS_CR) 1300 that could be produced by execution of the method 600.

Figure 16A:
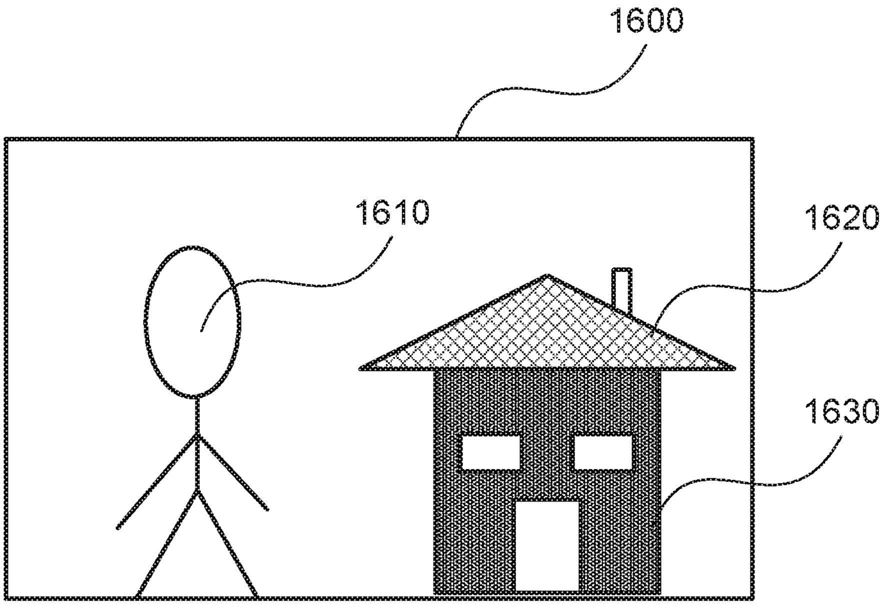
FIGS. 16A and 16B are representations of a chroma adjusted image obtained from an image according to one MFAM arrangement.
Figure 16B:
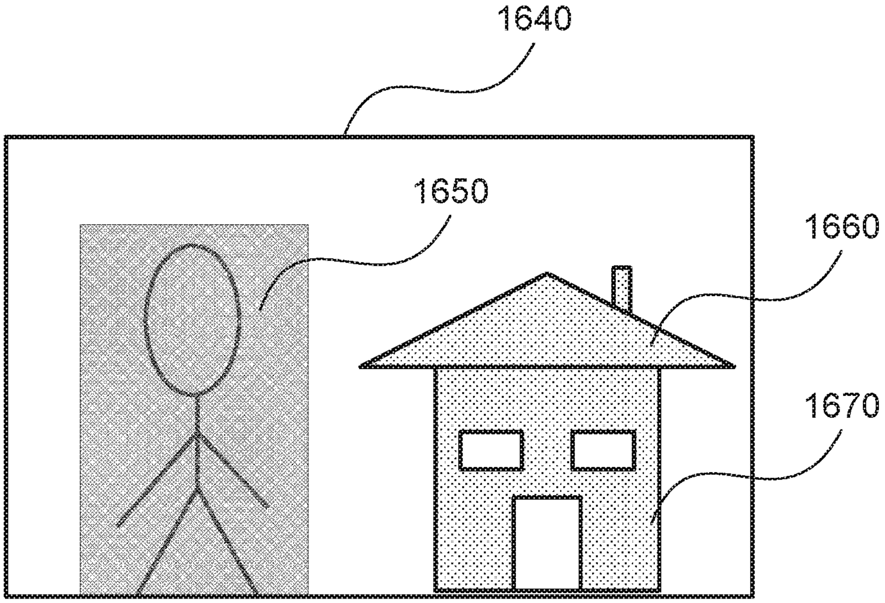

FIG. 16A shows a representation of an original image 1600 to be processed by a chroma increase. The image 1600 contains a near neutral colour image of a person 1610, and an image of a house with a blue roof 1620 and bright red walls 1630. FIG. 16B shows the representation 1640 of the image 1600 following a global chroma increase.

The content masking map 1300 in FIG. 13 shows the degree of perceived difference between the original image 1600 and the chroma increased image 1640. The near neutral colour image of a person 1650 (relating to the person 1610) has not been affected much by the chroma increase and the person 1650 is thus is not visible in a background 1310 of the content masking map 1300. In contrast, the blue roof 1660 in the boosted image 1640 is clearly more chromatic than the blue roof 1620 in the original image 1600 when viewed by a human being. Therefore, a region 1320 of the content masking map 1300, corresponding to the blue roof 1620 of the original image 1600, has a moderate value in the content masking map 1300, as depicted by relatively light shading. The walls of the house 1670 in the boosted image 1640 have the greatest degree of perceived difference for a human being compared to the walls of the house 1630 in the original image 1600. Accordingly, a region 1330 of the content masking map 1300 corresponding to the red walls 1630 of the original image 1600 has a high value in the content masking map 1300, as depicted by darker shading.

Returning to FIG. 6, the method 600 starts at step 610. In execution of the step 610, the SSIM luminance content masking map (MS_L) is determined. The MS_L content masking map is based on the MS-SSIM image quality metric. The MS_L content masking map is determined according to Equation (7) below.

$$MS\_L = 1.0 - LM(x,y)^{\alpha M} \qquad \text{Equation (7)}$$

where x and y are corresponding pixels in the contrast adjusted image 150 and the temporary transformed image 240, αM is ⅓ and LM(x,y) is determined according to Equation (8).

$$LM(x,y) = (2\mu ci\mu tt + C1)/(\mu ci^2 + \mu tt^2 + C1) \qquad \text{Equation (8)}$$

where μci is the local mean of a 11×11 region centred on pixels x,y in the contrast adjusted image 150 and μtt is the local mean of a 11×11 region centred on pixels x,y in the temporary transformed image 240. The constant C1 prevents numerical problems in the case that μci and μtt are close to zero. C1 is set to (0.01*imgrange)2 where imgrange is the range of luminance values in the contrast adjusted image 150. C1 is set to 255 in some MFAM arrangements.

The method 600 then proceeds under execution of the processor 1505 from step 610 to step 620. In execution of the step 620, the SSIM contrast content masking map (MS_C) is determined. The MS_C content masking map is based on the prior art MS-SSIM image quality metric. The MS_C content masking map is determined according to Equation (9) below.

$$MS\_C = 1.0 - \Pi_{j=1}^{M} cj(x,y)^{\beta j} \qquad \text{Equation (9)}$$

where x and y are corresponding pixels in the contrast adjusted image 150 and the temporary transformed image 240, $\beta_j$ is ⅓ and cj(x,y) is the contrast component of the MS-SSIM measure computed on the jth dyadic downsampled versions of the contrast adjusted image 150 and the temporary transformed image 240. The formula for cj(x,y) is given by Equation (10) below.

$$cj(x,y) = (2\sigma cij\sigma iij + C2)/(\sigma cij^2 + \sigma ttj^2 + C2) \qquad \text{Equation (10)}$$

where σcij is the local mean of a 11×11 region centred on pixels x,y in the jth dyadic downsampled version of the contrast adjusted image 150 and σttj is the local mean of a 11×11 region centered on pixels x,y in the jth dyadic downsampled version of the temporary transformed image 240. The constant C2 prevents numerical problems in the case that σcij and σttj are close to zero. C2 is set to (0.03*imgrange)2 where imgrange is the range of luminance values in the contrast adjusted image 150. C2 is set to 255 in the MFAM arrangements described.

The method 600 then proceeds under execution of the processor 1505 from step 620 to step 630. In execution of the step 630 the SSIM structure content masking map (MS_S) is determined. The MS_S content masking map is based on the MS-SSIM image quality metric. The MS_S content masking map is determined according to Equation (11) below.

$$MS\_C = 1.0 - \Pi_{j=1}^{M} sj(x,y)^{\gamma j} \qquad \text{Equation (11)}$$

where x and y are corresponding pixels in the contrast adjusted image 150 and the temporary transformed image 240, γj is ⅓ and sj(x,y) is the structure component of the MS-SSIM measure computed on the jth dyadic downsampled versions of the contrast adjusted image 150 and the temporary transformed image 240. The formula for sj(x,y) is given by Equation (12) below.

$$sj(x,y) = (\sigma ctj + C3)/(\sigma cij\sigma ttj + C3) \qquad \text{Equation (12)}$$

In Equation (12), σcij is the local mean of a 11×11 region centred on pixel x,y in the jth dyadic downsampled version of the contrast adjusted image 150 and σttj is the local mean of a 11×11 region centred on pixels x,y in the jth dyadic downsampled version of the temporary transformed image 240. The variable σctj denotes the covariance between pixels in a 11×11 region centred on pixel x,y in the jth dyadic downsampled version of the contrast adjusted image 150 and the same region in the jth dyadic downsampled version of the temporary transformed image 240. The constant C3 prevents numerical problems in the case that σcij and σttj are close to zero. C3 is set to C2/2 in the described MFAM arrangements.

The method 600 then proceeds under execution of the processor 1505 from step 630 to a step 640. In execution of the step 640 an additional luminance content masking map CUS_LUM is calculated. CUS_LUM map is determined by subtracting on a pixel by pixel basis the luminance of the contrast adjusted image 150 from the luminance of the temporary transformed image 240 in CIELAB colour space.

The method 600 then proceeds under execution of the processor 1505 from step 640 to a step 650. In execution of the step 650 an additional contrast content masking map CUS_CONT is calculated. The CUS_CONT content masking map is determined by computing local contrast maps for the contrast adjusted image 150 and the temporary transformed image 240. Local contrast of an image is computed based on a model using a difference of Gaussians filters (DoG) computed on the luminance channel only (CIELAB colour space).

The step 650 may for example be implemented using the following settings:

Radius of centre field (excluding centre pixel): 3 pixels (filter size 7×7 pixels)

Radius of surround field (excluding centre pixel): 6 pixels (filter size 13×13 pixels)

Initially, the whole image (the contrast adjusted image 150 or the temporary transformed image 240) is divided into non-overlapping blocks of 32×32 pixels (mainly for speedy processing). Within each block:

the local contrast based on DoG is computed for each pixel; and the average local contrast for the block is computed.

Such forms a contrast map with a down-sampled resolution of 32. The sub-resolution map is spatially up-sampled (without interpolation) to the resolution of the input image to obtain the final local contrast map.

The Contrast CM map (denoted as "CUS_CONT") is represented by Equation (13)

*CUS_CONT*=Local contrast map of temporary transformed image−Local contrast map of contrast adjusted image    Equation (13)

The method 600 then proceeds under execution of the processor 1505 from the step 650 to a step 660. In execution of the step 660 an additional noise content masking map CUS_NS is determined. The CUS_NS content-masking map is computed by measuring the variation/deviation of pixel values from the image's median values. The computation is performed in the sRGB colour space.

Deviation maps are computed for both the contrast adjusted image 150 and the temporary transformed image 240 at the step 660.

To create the deviation maps a 3×3 median filter is initially applied to the relevant image. The noise map for each image is represented by Equation (14) to Equation (17) below.

Diff_*R* (red pixels)=Pixel's *R* value−Pixel's median *R* value    Equation (14)

Diff_*G* (green pixels)=Pixel's *G* value−Pixel's median *G* value    Equation (15)

Diff_*B* (blue pixels)=Pixel's *B* value−Pixel's median *B* value    Equation (16)

Deviation map=sqrt(Diff_$R^2$+Diff_$G^2$+Diff_$B^2$)    Equation (17)

The custom Noise CM map (denoted as "CUS_NS") is represented by Equation 18.

*CUS_NS*=Deviation map of temporary transformed Image−Deviation map of contrast adjusted Image    Equation (18)

The CUS_NS map is further qualified by a pixel classification map prior to preference model feature extraction. In particular, the values in the CUS_NS map that correspond to the smooth regions are retained. The values in other regions (texture & edge) are set to 0. The pixel classification map is computed using 5×5 Sobel gradient detectors applied to the luminance channel of contrast adjusted image 150. The gradient at pixel x,y is given by sqrt($G_x^2+G_y^2$) where $G_x$ is the horizontal Sobel operator and $G_y$ is the vertical Sobel operator. Smooth regions are defined as regions where the Sobel gradient detector's magnitude is less than a threshold. In one MFAM arrangement the threshold is predetermined, and has a value of 13.

The method 600 then proceeds under execution of the processor 1505 from the step 660 to a step 670. In execution of the step 670 the chroma content masking map (CIS_CR) is determined. A method 700 to compute the CIS_CR content masking map, as implemented at step 670, will be described below with reference to FIG. 7. The output of step 670 is the chroma content masking map 690. The steps 610 to 670 in the method 600 may be performed in parallel or in series.

The method 600 then proceeds under execution of the processor 1505 from step 670 to a storing step 680. In execution of the storing step 680 content masking maps MS_L, MS_S, MS_C, CUS_LUM, CUS_CONT, CUS_NS and CIS_CR 670 are stored together as the set of content masking maps 260. The set of content masking maps 260 may for example be stored on the memory 1506. Following execution of step 680, the method 600 ends.

Figure 7:
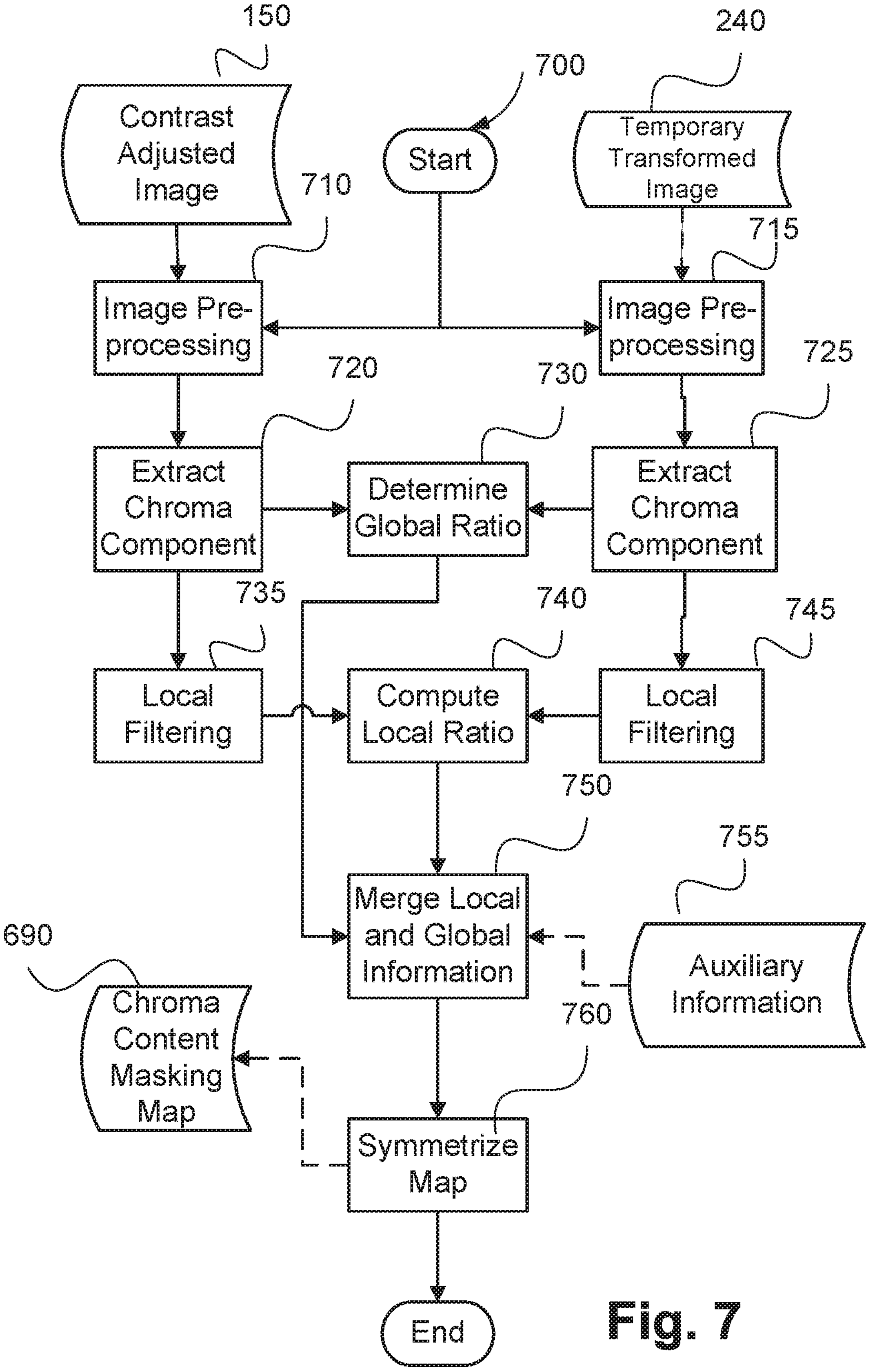
FIG. 7 is a schematic flow diagram of a method of determining a chroma content masking map.

FIG. 7 is a schematic flow diagram illustrating a method 700, for determining a chroma content masking map (CIS_CR).

The method 700 is typically implemented as one or more modules of the application 1533 stored in the memory 1506 and controlled by execution of the processor 1505.

The method 700 starts at pre-processing step 710 and pre-processing step 715. The steps 710 and 715 can be conducted in parallel or sequentially. In execution of the pre-processing step 710, any necessary image pre-processing is applied to the contrast adjusted image 150. The pre-processing applied will depend on circumstances surrounding the use of the MFAM arrangement. The pre-processing applied in step 710 may involve processes such as colour conversion, gamut mapping, pre-filtering, resolution adjustment, quantisation, and tone curve adjustment. For example, the content masking map created by method 700 may be for the purpose of adjusting the chroma of images for display on a target monitor. The step 710 in such an instance may involve clipping the gamut of the contrast adjusted image 150 to match the target monitor, reducing the resolution of the contrast adjusted image 150 to match the target monitor, and adjusting the bit-depth of the contrast adjusted image 150 to match that of the target monitor. This step 710 is relevant since details in the contrast adjusted image 150 that cannot be displayed on the target monitor should not be reflected in the content masking map generated by method 700. If the contrast adjusted image 150 is a scan of a half-toned image, then the step 710 might also involve a de-half-toning operation.

The step 715 executes to apply the same type of pre-processing to the temporary transformed image 240 as is applied by the step 710 to the contrast adjusted image 150. Generally, the pre-processing applied to the temporary transformed image 240 in the step 715 is identical to the pre-processing applied to the contrast adjusted image 150 by step 710. However, there may be some cases where different processing is applied between step 710 and 715. For example, if the temporary transformed image 240 is stored in a different colour space than the contrast adjusted image 150, then the step 715 might involve different colour transformation and gamut mapping than the step 710. Alternatively, both the steps 710 and 715 might be absent. This would occur in the case where the contrast adjusted image 150 and the temporary transformed image 240 do not require pre-processing steps.

The method 700 then proceeds under execution of the processor 1505 from the pre-processing steps 710 and 715 to extraction steps 720 and 725 respectively. The steps 720 and 725 can be conducted in parallel or sequentially. In the step 720, the chroma component of each pixel of the contrast adjusted image 150 is extracted. Extracting the chroma component of each pixel can be done by converting the image into the CIELCh colour space and extracting the C component of the image. Other colour spaces that have a suitable chroma or saturation-like component can be used for the steps 720 and 725. This includes the CIECAM02 colour space or the HSI colour space. The step 725 applies the same type of chroma extraction to the temporary transformed image 240 as was applied to the contrast adjusted image 150 in the step 720. Generally, the chroma extraction applied to the temporary transformed image 240 in step 725 is identical to the processing applied to the contrast adjusted image 150 in the step 720. However, there may be some cases where different processing is applied between the steps 720 and 725. For example, if the temporary transformed image 240 is stored in a different colour space than the contrast adjusted image 150, then the step 725 might involve different colour space than step 720.

The method 700 then proceeds under execution of the processor from the extraction steps 720 and 725 to filtering steps 735 and 745 respectively. The filtering steps 735 and 745 can be conducted in parallel or sequentially. In execution of the step 735, the chroma component of the contrast adjusted image 150 is filtered to remove details of the image that will not affect the human perception of the chroma of a region. It is known that humans do not perceive the chroma of an image at a high resolution, for example 300 dpi. Hence producing a chroma content masking map 690 at a high resolution is not required and may introduce unwanted noise into the chroma content masking map 690. Each location in the image has a local area surrounding it that directly affects the perception of chroma at that location. The step 735 filters the chroma component of the contrast adjusted image 150 by a low pass filter to remove unneeded detail within each local area. Such filtering can be achieved by taking advantage of the fact that human vision has a region of high resolution vision that covers only 2 degrees of the total visual field. Hence 2 degrees can be considered the size of local areas being examined by an observer and the rest of the image can be considered the background to the local area.

According to a one MFAM arrangement, the step 735 filters the chroma component of the contrast adjusted image 150 using a pillbox filter with a diameter that corresponds to 2 degrees of the field of view of an observer viewing the contrast adjusted image 150. If the distance that an observer is viewing the contrast adjusted image 150 is not known, the size of the pillbox filter may be calculated by assuming that the horizontal extent of the contrast adjusted image 150 subtends 30 degrees of the field of view of an observer. The diameter of the pillbox filter is then one-fifteenth of the horizontal extent of the contrast adjusted image 150. In other words, if the contrast adjusted image 150 has 1500 columns, then the diameter of the pillbox filter can be set to be 100 pixels.

Other filters can also be used for the step 735. For example a Gaussian filter with a standard deviation of 2 degrees and a region of support of at least 3 degrees may be used in execution of step 735. Alternatively, the filtering steps 735 and the step 745 might be skipped entirely.

The filtering step 745 applies the same type of local filtering to the temporary transformed image 240 as was applied to the contrast adjusted image 150 in the step 735. Typically, the filtering applied to the temporary transformed image 240 in the step 745 is identical to the processing applied to the contrast adjusted image 150. However, there may be some cases where different processing is applied between the steps 735 and 745. For example, if the temporary transformed image 240 is at a lower resolution than the contrast adjusted image 150, then the step 745 might involve a pillbox filter with a smaller diameter in terms of pixels than step 735.

The method 700 proceeds under execution of the processor 1505 from steps 720 and 725 to a determining step 730. The determining step 730 can be conducted in parallel or sequentially with the step 735, a step 740 and the step 745. The step 730 executes to determine a global change ratio that describes a degree to which the entire image has changed between the contrast adjusted image 150 and the temporary transformed image 240. There are many ways in which the global change ratio can be computed. In one MFAM arrangement, the global change ratio is the ratio of the mean of the chroma component of the entire temporary transformed image 240 over the mean of the chroma component of the entire contrast adjusted image 150. However, other ways to compute the global change ratio may be used including Euclidean distance between the mean of the chroma component of entire temporary transformed image 240 and the mean of the chroma component of the entire contrast adjusted image 150. Alternatively, an L1 norm may be used instead of the Euclidean distance.

The method 700 proceeds under execution of the processor 1505 from the step 730 to a determining step 740. The determining step 740 can be conducted in parallel or sequentially with the step 730. The step 740 executes to determine a local change ratio map that describes a degree to which the each part of the image has changed between the contrast adjusted image 150 and the temporary transformed image 240. There are many ways in which the local change ratio map can be determined. In one MFAM arrangement, the local change ratio map is the same size as the filtered chroma component of the contrast adjusted image 150 produced by the step 735. The value of the local change ratio map at row i and column j is the ratio of the value of the filtered chroma component of the temporary transformed image 240 at row i and column j over the value of the filtered chroma component of the contrast adjusted image 150 at row i and column j. If the contrast adjusted image 150 and the temporary transformed image 240 are at different resolutions, then corresponding locations are used to determine the local change ratio map. Other ways to determine the local change ratio map may be used, including Euclidean distance between each value of the filtered chroma component of temporary transformed image 240 and the corresponding value of the filtered chroma component of the contrast adjusted image 150. Alternatively the L1 norm may be used instead of the Euclidean distance.

The method 700 then proceeds under execution of the processor 1505 from steps 730 and 740 to a merging step 750. In execution of the merging step 750 the local change ratio map determined in the step 740 is combined with the global change ratio determined in the step 730 to produce the unsymmetrical chroma content masking map. Auxiliary information 755 may also be incorporated to determine the unsymmetrical chroma content masking map. In one MFAM arrangement the auxiliary information 755 is the filtered chroma component of the contrast adjusted image 150. However in other arrangements the auxiliary information could be other factors that might affect the perceived difference between contrast adjusted image 150 and the temporary transformed image 240 such as the hue, or luminance of the contrast adjusted image 150 or the temporary transformed image 240. Other factors that could be included as auxiliary information might be the viewing environment of the image such as the lighting colour temperature or the colour and brightness of the area in the observer's field of view outside of the image, or details specific to the observer such as the quality of the observer's vision.

In a particular MFAM arrangement, the global change ratio, local change ratio map and filtered chroma component of the contrast adjusted image 150 are combined according to Equation (19).

$$CM(i,j)=b(1)+b(2)\times LCRM(i,j)+b(3)\times GCR+b(4)\times LCRM(i,j)^2+b(5)\times GCR^2+b(6)\times FC(i,j) \quad \text{Equation (19)}$$

where CM(i,j) is the value of the unsymmetrical chroma content masking map at row i and column j; LCRM(i,j) is the value of the local change ratio map at row i and column j; FC(i,j) is the value of the filtered chroma component of the contrast adjusted image 150 at row i and column j; and GCR is the value of the global change ratio.

In the particular MFAM arrangement, the coefficients of the equation above to create the unsymmetrical chroma content masking map are set out in the following table of coefficients (Table 9):

TABLE 9

Coefficients of Equation (19)

| Coefficient | Value |
|---|---|
| b(1) | −24 |
| b(2) | 13 |
| b(3) | 19 |
| b(4) | −4 |
| b(5) | −6 |
| b(6) | 0.034 |

The coefficients in the above Table 9 were determined by the inventors through a psychophysical experiment. However different coefficient values can be used in other MFAM arrangements depending on the intended use of the unsymmetrical chroma content masking map, the demographic of people for whom the unsymmetrical chroma content masking map is intended to represent, or whether the content masking map is intended to represent the perceived difference of an image processing transform other than chroma adjustment.

The method 700 then proceeds under execution of the processor 105 from the merging step 750 to a symmetrizing step 760. The unsymmetrical chroma content masking map has a term that depends only on the chroma of the contrast adjusted image 150. This means that the unsymmetrical chroma content masking map may not give complementary results if the temporary transformed image 240 and contrast adjusted image 150 are swapped as inputs to method 700. In some implementations, the chroma content masking map arising from swapping the inputs to method 700 is the negation of the chroma content masking map with the inputs in the unswapped order.

The symmetrizing step 760 executes to make the chroma content masking map symmetrical by testing the mean chroma of the contrast adjusted image 150 and the temporary transformed image 240. If the temporary transformed image 240 has a lower mean chroma than the contrast adjusted image 150, then method 700 is performed again with the temporary transformed image 240 in the place of the contrast adjusted image 150 and vice versa (in other words the inputs to method 700 are swapped). If step 760 has swapped the inputs to method 700 then the output of step 750 (the unsymmetrical chroma content masking map) negated to signify that chroma decrease has occurred. Otherwise the unsymmetrical chroma content masking map is not modified. This produces the effect that the chroma content-masking map will produce positive values for chroma increases and negative values for chroma decreases. The output of step 760 is the chroma content masking map 690.

Following execution of the step 760, the method 700 ends.

Method to Compute Global Summary Statistics

Figure 8:
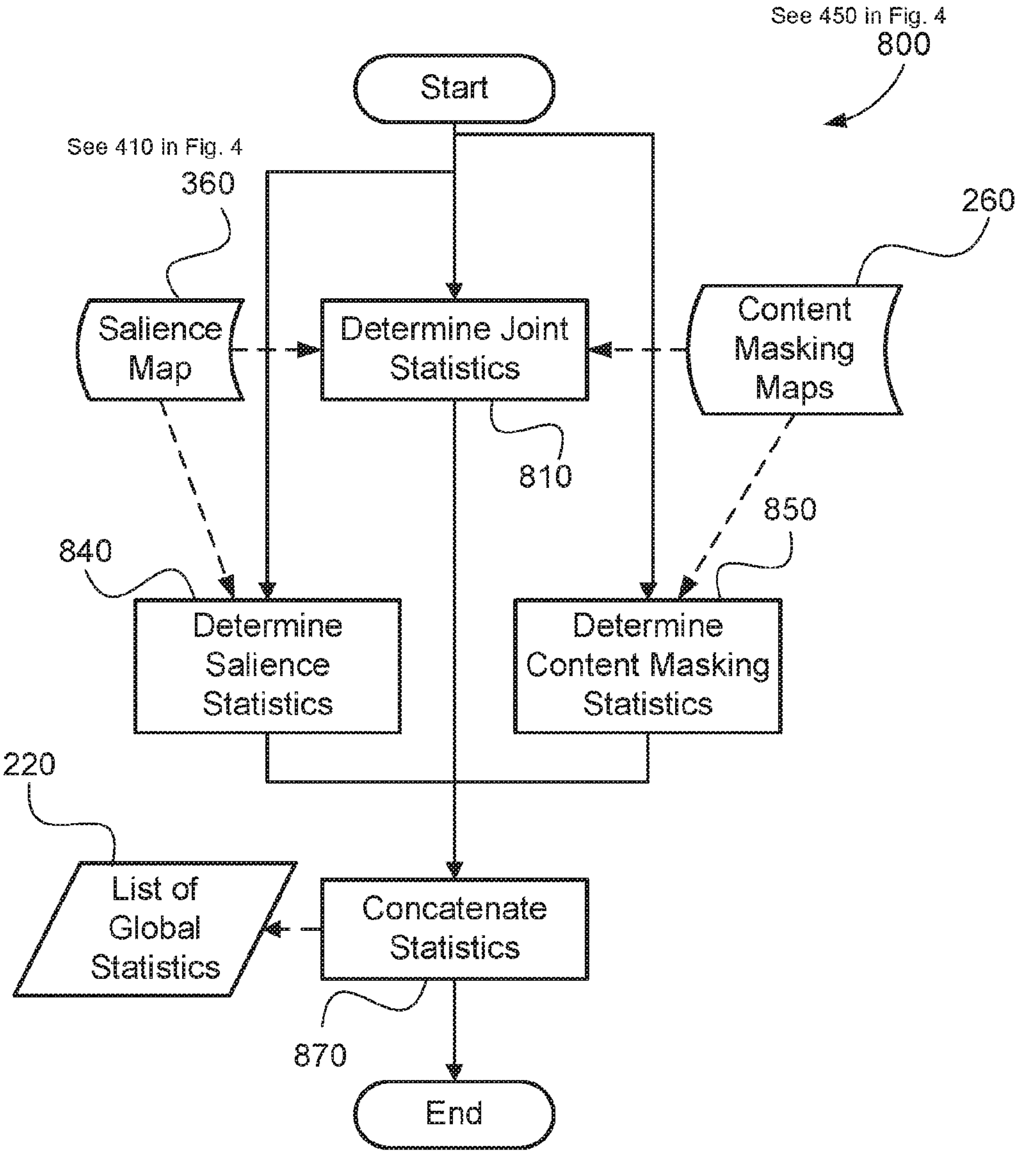
FIG. 8 is a schematic flow diagram illustrating method of determining a set of global summary statistics according to one MFAM arrangement.

FIG. 8 is a schematic flow diagram illustrating the method of 800 determining a set of global summary statistics 220 according to one MFAM arrangement. More particularly, FIG. 8 depicts a method 800 for determining global summary statistics 220 from the content masking maps 260 and the salience map 360 that can be used by the step 450 in the method 400 in FIG. 4. The method 800 is typically implemented as one or more modules of the application 1533 stored in the memory 1506 and controlled by execution of the processor 1505.

The method 800 starts with determining steps 810, 840, and 850 which may be performed in parallel or sequentially. If performed sequentially, the determining steps 810, 840 and 850 may be performed in any order.

The step 840 executes to determine statistics specific to the salience map 360 created in the step 410 in the method 400. In a particular MFAM arrangement, the following statistics are determined and set out in the Table of Statistics (Table 1) above and repeated below as Table 10.

TABLE 10

| Determined Statistics | |
|---|---|
| SM_coverage | A measure of what percentage of the target image contains salient objects: $$\sum_{i=1}^{M}\sum_{j=1}^{N} SM(i, j)/MN$$ where M is the number of rows in the target image and N is the number of columns and SM(i, j) is the salience map 360. |
| SM_entropy | The entropy of the salience map: $$-\sum_{j=1}^{J} hSM(j)\log hSM(j)$$ where hSM(j) is the value of the jth bin of the histogram (normalised to a sum of unity) of the values of the salience map 360 and J is the number of bins in the histogram (chosen to be 100 in this investigation). |

However, that there are many other statistics that may be determined from the salience map 360 in the step 840. Other examples include the variance, skew, kurtosis or mean of the values of the salience map 360.

The step 850 executes to determine statistics specific to each of the content masking maps 260 created in the step 430 in the method 400. In a particular MFAM arrangement, the following statistics are determined, as set out in the following Second Table of Statistics (Table 2) above and repeated below as Table 11.

TABLE 11

| Determined Statistics | |
|---|---|
| CMmap_mean | The mean value of the content masking map 260. |
| CM_entropy | The entropy of the chroma content masking map 260: $$-\sum_{j=1}^{J} hCM(j)\log hCM(j)$$ where hCM(j) is the value of the jth bin of the histogram (normalised to a sum of unity) of the values of the content masking map 260 and J is the number of bins in the histogram (chosen to be 100 in this example). |

The statistics in Tables 2 and 11 are determined for each of the content masking maps. There are, however, many other statistics that may be determined from the content masking maps 260 in the step 850. Other examples include the variance, skew, kurtosis or mean of the values of the content masking maps 260.

The step 810 executes to determine joint statistics that quantify the similarity of the content masking maps 260 and the salience map 360. In a particular MFAM arrangement, the following statistics are determined, as set out in the following Third Table of Statistics (Table 3) shown above and repeated below as Table 12:

TABLE 12

| Determined Statistics | |
|---|---|
| WCMmap_mean | The weighted mean value of the content masking map, where the weighting is by the image salience 360. For a target image of M rows and N columns, this is determined by: $$\sum_{i=1}^{M}\sum_{j=1}^{N} SM(i, j)CM(i, j)\Big/\sum_{i=1}^{M}\sum_{j=1}^{N} SM(i, j)$$ where SM(i, j) is the (i, j)th pixel of the salience map 670 of the target image, CM(i, j) is the (i, j)th pixel of the content masking map of the target image. |
| WCM_sal_meanratio | The ratio of the salience weighted mean of the content masking map over the unweighted mean content masking map: WCMmap_mean/CMmap_mean |
| CM_SM_corr | The two-dimensional linear correlation coefficient between the salience map 360 and the content masking map and/or between regions of the salience map 360 and regions of the content masking map. |
| WCM_sal_sumratio | The ratio of the sum of the values of the salience weighted content masking map over the sum of the values of the unweighted content masking map. |

The statistics in Tables 3 and 12 are computed for each of the content masking maps. There are, however, many other joint statistics that may be determined to quantify the similarity between the content masking maps 260 and the salience map 360 in the step 810. Other examples include measures of mutual information or earthmovers distance between each of the content masking maps 260 and the salience map 360. In computer science, the earth mover's distance (EMD) is a measure of the distance between two probability distributions over a region D. In mathematics, this is known as the Wasserstein metric.

Once the steps 810, 840 and 850 have been completed, the method 800 then proceeds under execution of the processor 1505 to a step concatenation step 870. The concatenation step 870 executes to concatenate the statistics determined in the steps 810, 840 and 850 into a list 220 of global statistics and stores the list, for example in the memory 1506.

Following execution of the step 870, the method 800 ends.

A Method to Log-Odds Measures

Figure 9:
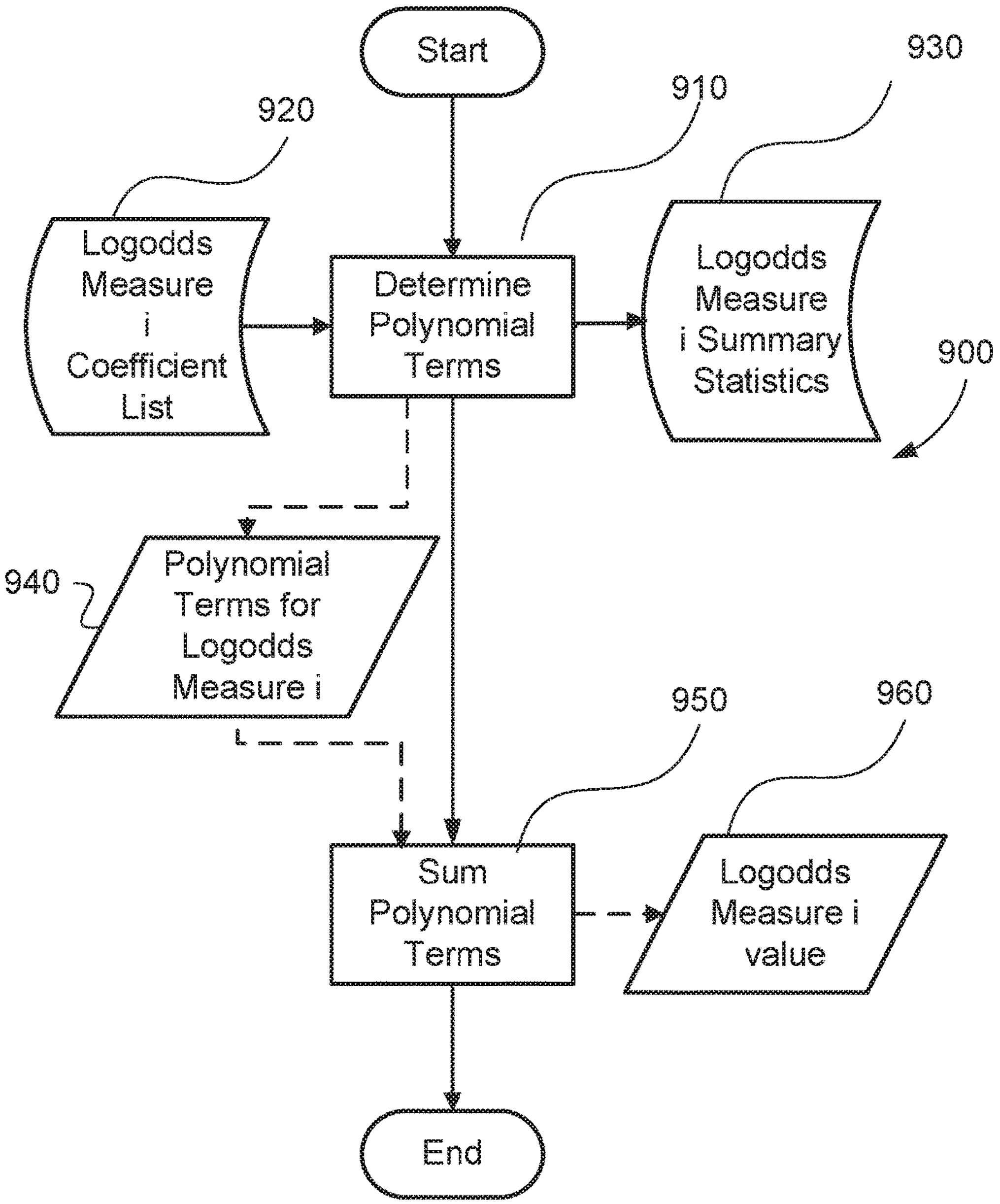
FIG. 9 is a schematic flow diagram illustrating a method of determining a log-odds measure according to one MFAM arrangement.

FIG. 9 is a schematic flow diagram illustrating a method 900 of determining a log-odds measure value according to one MFAM arrangement. In particular, FIG. 9 describes the method 900 for determining the ith log-odds measure value that can be used by the steps 480 to 490 of the method 400. The method 900 can be used to determine preference measure values in the steps 480 to 490 regardless of the number of preference measures to be determined or which preference measure is being determined. The data used by the method 900 may change according to which log-odds measure is being determined, but the steps involved in the method 900 will typically not change.

The method 900 is typically implemented as one or more modules of the application 1533 stored in the memory 1506 and controlled by execution of the processor 1505.

The method 900 starts at a determining step 910. Execution of the determining step 910 determines polynomial terms required to determine the ith log-odds measure value. Summary statistics 930 specific to the ith log-odds measure that have been determined by the steps 460 to 470 in method 400 and stored as data 930 are multiplied, in the step 910, by corresponding polynomial coefficients 920 that have previously been stored in a predetermined list 920, to create polynomial terms 940 for log-odds measure i.

The log-odds measure i coefficient list 920 can be obtained by conducting a psychophysical experiment to model the effect that an image transform such as that applied in step 104 or step 111 of the method 100 has on the observer preference judgments. The psychophysical experiment can be performed by asking a set of observers to grade a range of images, before and after the transform has been applied to the target image 110 to form the transformed image 120, into N preference levels such as (A) "strongly prefer target image", (B) "prefer target image", (C) "no preference", (D) "prefer transformed image", . . . , (N) "strongly prefer transformed image". Such relates to an N−1 degree of freedom MFAM arrangement.

The aforementioned decisions by the observers can be used to determine measured observer preference distributions of the transform by determining the percentage of observers that had judgments in each of the N preference levels and converting the percentages into probabilities by dividing the percentages by 100. As noted above, the measured observer preference distributions have N−1 degrees of freedom since each measured observer preference distribution must be constrained to sum to unity. Hence probabilities in each bin in the measured observer preference distribution may be modelled by N−1 preference measure values, one for each of N−1 preference levels of the N preference levels used in the experiment, with counts in the Nth bin estimated by subtracting the predicted counts (preference measures) computed for the other N−1 bins from unity.

By varying the parameters of the transform applied to the set of tested images and repeating the experiment, a set of measured observer preference distribution values can be obtained for different parameter values of the transform or set of transforms (for example the aspects of noise, chroma, luminance, contrast and sharpness mentioned above) being studied. Preference distribution values are limited to ranges of 0 to 1 (when expressed as a probability) or 0 to 100 (when expressed as a percentage). This limited range can cause difficulties when fitting polynomials to the preference values so in the described MFAM arrangement, the N preference levels are converted to N−1 log-odds representations. In the described MFAM arrangement, the log-odds representations are described by Equation (20) and Equation (21).

$$LOM1=\log(\text{"Preference for Original image"}/\text{"Preference for Transformed"}) \quad \text{Equation (20)}$$

$$LOM2=\log(\text{"No Preference"}/(\gamma(1-(\text{"No Preference"})))) \quad \text{Equation (21)}$$

In Equations (20) and (21) "Preference for Original image" is the proportion of the observers that indicated a preference for the original image determined in the psychophysical experiment described above. "Preference for the Transformed" is the proportion of the observers that indicated a preference for the transformed image and "No Preference" is the proportion of observers that both the original and transformed images were of equal preference. The constant $\gamma$ is equal to 0.8 in the particular MFAM arrangement described, corresponding to a prior determination that in the case when the transformed image is identical to the original image, the "Preference for Original Image" would be equal to the "Preference for Transformed" and the "No Preference" measure would be equal to 0.8.

Regression techniques can then be used to create polynomial models to estimate the log-odds measures for the N−1 degrees of freedom for the measured observer preference distributions in the set. During the process of creating the log-odds measure values, the summary statistics (such as in the list 461) from the content masking maps 260 and the salience map 360 that best model the measured data can be determined for each log-odds measure and stored for use by the step 450 and the steps 460 to 470 in the method 400. The coefficients of the polynomial models created to predict each log-odds measure can then be stored in the N−1 log-odds measure coefficient lists 920.

The above technique can be used to create models that predict observer preference distributions for parameters values of the image processing transform outside of the set used in the experiment due to the continuous nature of the polynomial models used for each of the preference measures. In addition, as the summary statistics presented above capture only the most pertinent information from the original and transformed images seen by observers in the experiment, the above technique can be used to create models that predict observer preference distributions for images not seen during the experiment used to create the models.

By way of example, an experiment performed by the inventors to create a model of observer preference distributions is now described. Five image aspects (luminance, contrast, sharpness, chroma and shot noise) were modified at 5 levels in a fractional factorial experimental design that contained a total of 26 combinations of aspect modifications. Observers viewed a set of 650 original-modified image pairs where the modified image was obtained by modifying an original image by varying one of more of the five aspects. The experiment included 25 different original images. The 25 experimental images were chosen to represent a range of different content. Seventy observers took part in the experiment. The observers were checked for colour blindness and visual acuity using standard vision testing equipment. The observers viewed the images on two colour calibrated monitors in a controlled laboratory setting. The colour temperature and luminance level of the monitors' white points and the ambient illumination and the colour of the background were characterised and controlled.

Each observer was asked whether they preferred the original image, preferred the transformed image or had no preference (i.e. a two degree of freedom preference distribution). The observers viewed both the original and transformed images simultaneously on two side-by-side monitors.

So that knowledge of which of the images was the original image and which was the transformed image would not affect the observer's preferences the computer would randomly select whether for any given participant the original image was displayed on the left or right monitor while keeping track of which images were shown to the observer and whether the original image was on the right monitor or left monitor.

When ready to make a judgement, the observers pressed keys on the keyboard to indicate whether they preferred image 1, image 2 or had no preference. In the case that the observers indicated that they preferred either image 1 or image 2, the computer would recall which of image 1 and image 2 corresponded to the original image and transformed image and hence assign the observer's indicated preference to either "preference for the target image" or "preference for the transformed image" accordingly. The measured observer preference distributions hence had three bins (like that shown in FIG. 10A), with two degrees of freedom. The two log-odds measures as described above were chosen to model the observer preference distributions.

For each of the two log-odds measures, salience maps such as the salience map 360 and content masking maps such as the map 260 were extracted and the summary statistics (and high-level features such as functions of summary statistics, such as squared summary statistics and multiplications of two summary statistics) such as 461 described above were extracted. Tables 13 and 14 below show summary statistics, high-level features and corresponding coefficients determined from the experiment.

TABLE 13

Polynomial Model for log-odds measure "LOM1"

| Summary Statistic (Definition of summary statistics are given in Table of Statistics (Table 1, Table 2 and Table 3) above) | Polynomial Coefficient |
|---|---|
| Constant (Intercept term in model) | 0.575 |
| CIS_CR_CMmap_mean | −0.916 |
| MS_C_WCMmap_mean * MS_C_CM_SM_corr | 14.9 |
| $(\text{CUS\_LUM\_CM\_entropy})^2$ | 0.0174 |
| CUS_CONT_CM_SM_corr * CUS_LUM_CM_SM_corr | 1.78 |
| CUS_NS_WCMmap_mean * CUS_NS_CM_SM_corr | −138 |
| CUS_CONT_CM_SM_corr * MS_L_WCMmap_mean | 22.9 |
| CUS_NS_CM_SM_corr * MS_L_WCM_sal_sumratio | 1.83 |
| CUS_LUM_WCMmap_mean * MS_S_WCM_sal_sumratio | 6.44 |
| CUS_LUM_CM_entropy * MS_C_WCMmap_mean | 0.594 |
| $(\text{CUS\_LUM\_CMmap\_mean})^2$ | 35.4 |
| CUS_LUM_WCMmap_mean * MS_L_WCMmap_mean | −118.2 |
| CUS_CONT_CM_SM_corr * MS_L_CMmap_mean | 16.4 |
| CUS_LUM_CM_SM_corr * MS_C_CMmap_mean | 11.5 |
| MS_C_CM_SM_corr * MS_L_WCMmap_mean | 22.3 |
| CIS_CR_CM_SM_corr * CUS_LUM_WCMmap_mean | −4.600 |
| CUS_LUM_CM_entropy * MS_C_WCM_sal_meanratio | 0.0375 |
| CUS_NS_CMmap_mean * CUS_NS_WCMmap_mean | 1733.0 |
| CIS_CR_CM_entropy * MS_L_CMmap_mean | 0.559 |
| CUS_CONT_CM_SM_corr * MS_S_CM_SM_corr | −0.34 |
| CIS_CR_CMmap_mean * CUS_LUM_CM_entropy | −0.0493 |
| CIS_CR_WCMmap_mean * CUS_LUM_WCMmap_mean | −4.88 |
| CIS_CR_WCM_sal_meanratio * CIS_CR_SM_entropy | −0.0573 |
| MS_C_WCMmap_mean * MS_S_CMmap_mean | 48.7 |
| CUS_CONT_CMmap_mean * MS_C_CM_SM_corr | 5.22 |
| MS_L_WCM_sal_sumratio * MS_S_CM_entropy | −0.0401 |
| CUS_NS_WCMmap_mean * MS_L_CMmap_mean | 298 |
| CUS_LUM_WCM_sal_meanratio * CUS_NS_WCM_sal_sumratio | −0.0240 |
| CUS_CONT_WCM_sal_sumratio * CUS_LUM_CM_SM_corr | 0.202 |
| $(\text{CUS\_NS\_WCM\_sal\_meanratio})^2$ | 0.00334 |
| CIS_CR_WCMmap_mean * CUS_LUM_WCM_sal_meanratio | −0.0323 |
| $(\text{CIS\_CR\_WCMmap\_mean})^2$ | 0.294 |
| CIS_CR_WCMmap_mean * CUS_CONT_CM_SM_corr | −0.130 |
| CUS_CONT_CM_entropy * MS_L_WCM_sal_sumratio | −0.0117 |
| CIS_CR_CM_SM_corr * CUS_NS_CM_SM_corr | −0.110 |
| CUS_LUM_CM_SM_corr * MS_L_CM_SM_corr | −0.141 |
| CUS_CONT_CM_entropy * MS_L_WCM_sal_meanratio | −0.000455 |
| CUS_LUM_WCM_sal_sumratio * CUS_NS_WCM_sal_meanratio | −0.000214 |
| CIS_CR_CM_SM_corr * CUS_LUM_CMmap_mean | −0.00520 |

TABLE 14

| Polynomial Model for log-odds measure "LOM2" Summary Statistic (Definition of summary statistics will be given in Table of Statistics (Table 1, Table 2 and Table 3) above) | Polynomial Coefficient |
|---|---|
| Constant (Intercept term in model) | −0.556 |
| (CIS_CR_CMmap_mean)2 | −0.559 |
| (CUS_LUM_WCMmap_mean)2 | −115 |
| CIS_CR_CMmap_mean * CIS_CR_WCMmap_mean | −0.0105 |
| CIS_CR_WCMmap_mean * MS_S_CMmap_mean | 11.5 |
| CIS_CR_WCM_sal_meanratio * MS_C_WCMmap_mean | −0.238 |
| CIS_CR_CM_entropy * CUS_CONT_CM_entropy | −0.00411 |
| CIS_CR_CM_entropy * MS_C_WCM_sal_meanratio | −0.00880 |
| CIS_CR_CM_entropy * MS_L_CM_entropy | −0.00700 |
| CIS_CR_CM_entropy * MS_S_WCM_sal_meanratio | −0.103 |
| CUS_CONT_CM_SM_corr * MS_L_CMmap_mean | −3.95 |
| CUS_LUM_WCMmap_mean * MS_S_CMmap_mean | −65.5 |
| CUS_LUM_CM_entropy * MS_C_WCMmap_mean | −0.633 |
| CUS_LUM_CM_entropy * MS_C_WCM_sal_meanratio | −0.200 |
| CUS_LUM_CM_entropy * MS_C_CM_SM_corr | −0.0508 |
| CUS_NS_WCM_sal_meanratio * MS_L_CM_entropy | $-8.51 \times 10^{-5}$ |
| CUS_NS_CM_SM_corr * MS_L_WCMmap_mean | 2.92 |

TABLE 14-continued

| Polynomial Model for log-odds measure "LOM2" Summary Statistic (Definition of summary statistics will be given in Table of Statistics (Table 1, Table 2 and Table 3) above) | Polynomial Coefficient |
|---|---|
| CUS_NS_CM_entropy * MS_C_WCMmap_mean | −3.10 |
| MS_C_WCMmap_mean * MS_C_WCM_sal_meanratio | −2.83 |
| MS_C_WCMmap_mean * MS_S_WCMmap_mean | −128 |
| MS_C_CM_SM_corr * MS_L_WCMmap_mean | −10.9 |
| MS_C_CM_SM_corr * MS_S_CMmap_mean | −2.16 |
| MS_C_CM_SM_corr * MS_S_CM_SM_corr | 1.08 |
| MS_L_WCMmap_mean * MS_L_WCM_sal_sumratio | −24.7 |

The output of the step 910 is a list 940 of polynomial terms for log-odds measure i.

The method 900 progresses under execution of the processor 1505 from the determining step 910 to a summing step 950. In execution of the summing step 950 the polynomial terms of the list 940 are summed to create log-odds measure i value 960. Following execution of the step 950, the method 900 ends.

In the example of FIG. 9 above each log-odds measure value has been determined using a polynomial function of the summary statistics. However, the method 900 can be performed in a number of different ways. For example, different functions of the summary statistics may be used including non-linear transforms, machine learning frameworks such as neural networks, or models based on cognitive processes used by observers during the process of judging image preference.

Example(s)/User Case(s)

Figure 14A:
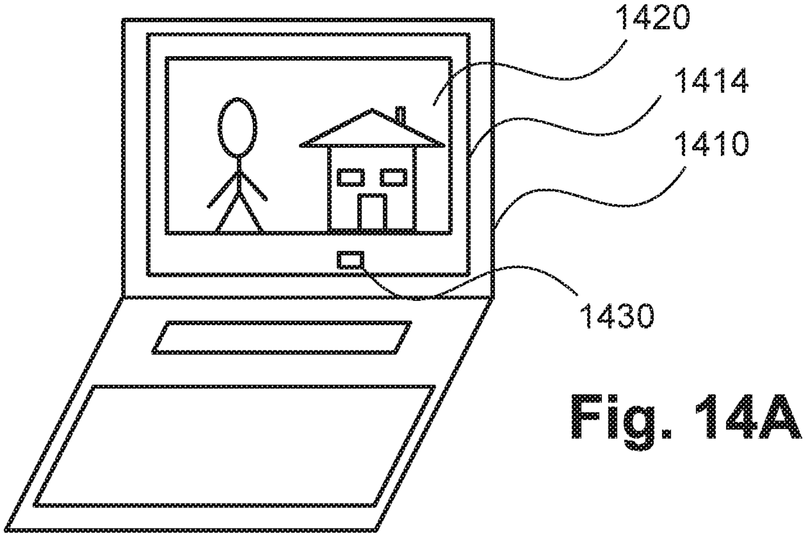
FIGS. 14A and 14B are diagrams illustrating how the MFAM arrangement could be used on a computer to display a transformed in one MFAM arrangement.

FIG. 14A depicts a use case of the described MFAM arrangements. FIG. 14A shows a laptop computer 1410 on which the MFAM arrangement can be performed. The laptop computer operates in a similar manner to the computer module 1501. The MFAM arrangement described is executed on a processor of the computer 1410. In the example of FIG. 14A, the user uses the MFAM arrangement in order to find the optimal contrast and luminance adjustments for an image 1420 currently shown on a display 1414 of the computer 1410. A button 1430 is also shown on the display 1414. The user may select the button 1430 with an input such as a click of a mouse (not shown) of the computer 1410 in order to begin the image editing process.

Once the user has selected the button 1430, the GUI display 1200 shown in FIG. 12 is shown on the display 1414 of computer 1410. The user selects a region of the image 1216 by clicking on part of the image in the GUI and dragging the mouse to select a region of the image 1216. The user then moves the slider 1203 on the contrast adjust control 1202 and the image is processed according to the MFAM system described above to create a contrast adjusted image 150 which is shown in the GUI in place of the original image 1201. The luminance adjustment control 1206 is modified to show global luminance adjustments that have a positive improvement to the preference for the transformed image (green areas 1212 on the luminance adjustment control 1206) or have a negative effect on the preference for the transformed image (red areas 1213 and 1214 on the luminance adjustment control 1206), as well as the optimal luminance adjustment 1215. The user then selects a luminance adjustment by moving the slider 1207 on the luminance adjustment control 1206 and the MFAM system produces the transformed image.

Figure 14B:
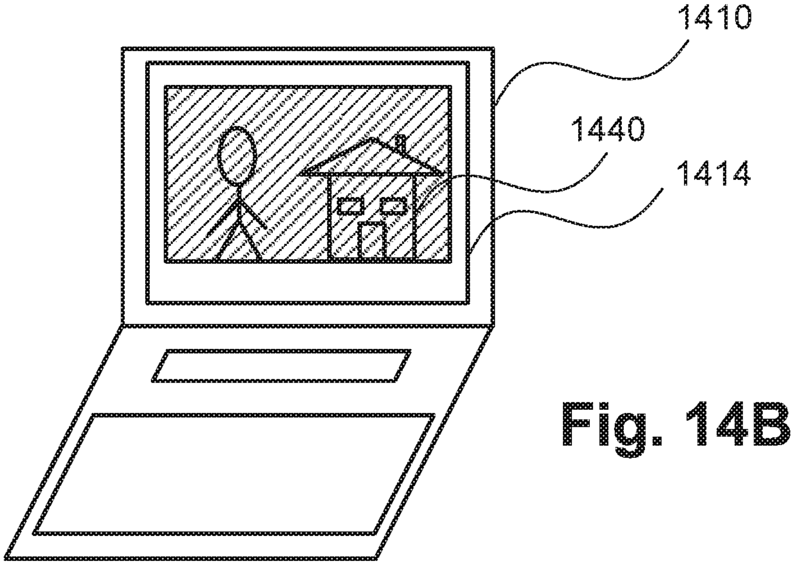

FIG. 14B shows the computer 1410 with a transformed image 1440 generated by the MFAM system displayed at full resolution so that the user can appreciate the results.

The arrangements described herein provide for technical improvements in suggesting a second aspect adjustment for images to which a first aspect adjustment has already been applied. The arrangements described base the suggestion of the second aspect adjustment on user preferences, which can be easily implemented. The arrangements described use interaction of two different aspects (such as contrast and luminance) of an image and saliency of objects to determine relevant areas and suggest aspect adjustments that a user is likely to implement.

The arrangements described are applicable to the computer and data processing industries and particularly for the image processing and image editing.

The foregoing describes only some embodiments of the present invention, and modifications and/or changes can be made thereto without departing from the scope and spirit of the invention, the embodiments being illustrative and not restrictive.

The invention claimed is:

1. A method of displaying a suggested luminance adjustment for an image, the method comprising:

applying a contrast adjustment to a first region of the image, the contrast adjustment defining a preference for the contrast adjusted image;

determining a second region of the contrast adjusted image based on a salience map associated with the contrast adjusted image and the preference for the contrast adjusted image; and displaying a visual indication of the suggested luminance adjustment for the second region over the contrast adjusted image, wherein the suggested luminance adjustment is determined based on a preference of the contrast adjusted image with the suggested luminance adjustment applied and a contribution of high-level feature data to the preference for the contrast adjusted image.

2. The method according to claim 1, wherein the suggested luminance adjustment is determined relative to at least one of the contrast adjustment applied to the first region and a saliency value associated with the second region.

3. The method according to claim 1, wherein the suggested luminance is determined based on the preference of the contrast adjusted image with the suggested luminance adjustment applied being greater than the preference for the contrast adjusted image.

4. The method according to claim 1, wherein displaying the visual indication comprises modifying display of a luminance control to indicate an optimal suggested luminance adjustment, the optimal suggested luminance adjustment being one of a plurality of luminance adjustments having a highest preference of the contrast adjusted image with a corresponding luminance adjustment applied.

5. The method according to claim 1, wherein displaying the visual indication comprises modifying display of a luminance control to indicate to a user a range of luminance adjustments determined to have positive preferences of the contrast adjusted image with the luminance adjustments of the range applied.

6. The method according to claim 1, wherein displaying the visual indication comprises modifying display of a luminance control to identify to a user a range of luminance adjustments determined to have negative preferences of the contrast adjusted image with the luminance adjustments of the range applied.

7. The method according to claim 1, wherein displaying the visual indication comprises displaying the suggested luminance adjustment as an overlay on the contrast adjusted image.

8. The method according to claim 1, further comprising receiving a luminance adjustment after display of the visual indication and applying the received luminance adjustment to the contrast adjusted image.

9. The method according to claim 1, further comprising applying a plurality of luminance adjustments to the contrast adjusted image, and determining a preference for each of the plurality of luminance adjustments applied to the contrast-adjusted image.

10. The method according to claim 9, wherein the suggested luminance adjustment is determined based upon the preferences of the plurality of luminance adjustment.

11. The method according to claim 1, wherein the second region is defined by a pixel map and a degree of change of luminance associated with each pixel in the pixel map.

12. The method according to claim 1, wherein the suggested luminance adjustment represents a degree of change of a luminance setting relating to each pixel of the second region.

13. The method according to claim 1, wherein the second region is determined based upon the salience map and a degree of difference user would perceive between the image and the contrast adjusted image.

14. The method according to claim 1, further comprising determining the salience map based upon the contrast adjusted image.

15. The method according to claim 1, wherein the high-level feature data is derived from the salience map and one or more content masking maps.

16. The method according to claim 1, wherein the high-level feature data further comprises coefficient of high-level feature and rank of high-level feature.

17. The method according to claim 16, wherein the one or more content masking maps quantify a degree of difference perceivable between the image prior to contrast adjustment and the contrast adjusted image.

18. A non-transitory computer readable storage medium having a program recorded thereon, the program being executable by a processor for displaying a suggested aspect adjustment for an image, the program comprising:

code for applying a first adjustment of a first aspect to a first region of the image, the first adjustment defining a preference for the adjusted image;

code for selecting a second region of the adjusted image based on a salience map associated with the adjusted image and the preference for the adjusted image; and code for displaying a visual indication of a suggested second adjustment over the adjusted image, the second adjustment being of a second aspect for the second region, wherein the suggested second adjustment is determined based on a preference of the adjusted image with the second suggested adjustment applied and a contribution of high-level feature data to the preference for the adjusted image.

19. An apparatus for displaying a suggested luminance adjustment for an image, the apparatus comprising:

a memory; and a processor coupled to the memory for executing a computer program, the computer program comprising instructions for:

applying a contrast adjustment to a first region of the image, the contrast adjustment defining a preference for the contrast adjusted image;

determining a second region of the contrast adjusted image based on a salience map associated with the contrast adjusted image and the preference for the contrast adjusted image; and displaying a visual indication of the suggested luminance adjustment for the second region over the contrast adjusted image, wherein the suggested luminance adjustment is determined based on a preference of the contrast adjusted image with the suggested luminance adjustment applied and a contribution of high-level feature data to the preference for the contrast adjusted image; wherein the suggested luminance adjustment is determined relative to at least one of the contrast adjustment applied to the first region and a saliency value associated with the second region.

20. A system for displaying a suggested aspect adjustment for an image; the system comprising:

a computing device adapted to:

apply a first adjustment of a first aspect to a first region of the image, the first adjustment defining a preference for the adjusted image;

select a second region of the adjusted image based on a salience map associated with the adjusted image and the preference for the adjusted image; and display a visual indication of a suggested second adjustment over the adjusted image, the second adjustment being of a second aspect for the second region, wherein the suggested second adjustment is determined based on a preference of the adjusted image with the second suggested adjustment applied and a contribution of high-level feature data to the preference for the adjusted image; wherein the suggested second adjustment is determined relative to at least one of the first adjustment applied to the first region and a saliency value associated with the second region.

* * * * *